(12) United States Patent
Akahori et al.

(10) Patent No.: US 10,443,276 B2
(45) Date of Patent: Oct. 15, 2019

(54) VEHICLE DOOR LATCH DEVICE

(71) Applicant: MITSUI KINZOKU ACT CORPORATION, Kanagawa (JP)

(72) Inventors: Masakazu Akahori, Kanagawa (JP); Chenming Zhang, Kanagawa (JP)

(73) Assignee: Mitsui Kinzoku Act Corporation, Kanagawa (JP)

( * ) Notice: Subject to any disclaimer, the term of this patent is extended or adjusted under 35 U.S.C. 154(b) by 407 days.

(21) Appl. No.: 15/321,509

(22) PCT Filed: Jan. 6, 2015

(86) PCT No.: PCT/JP2015/050136
§ 371 (c)(1),
(2) Date: Dec. 22, 2016

(87) PCT Pub. No.: WO2016/009656
PCT Pub. Date: Jan. 21, 2016

(65) Prior Publication Data
US 2017/0204639 A1 Jul. 20, 2017

(30) Foreign Application Priority Data
Jul. 18, 2014 (JP) ................................. 2014-148040

(51) Int. Cl.
*E05B 79/08* (2014.01)
*B60J 5/00* (2006.01)
(Continued)

(52) U.S. Cl.
CPC ................. *E05B 79/08* (2013.01); *B60J 5/00* (2013.01); *E05B 15/1635* (2013.01);
(Continued)

(58) Field of Classification Search
CPC .......... E05B 81/06; E05B 81/54; E05B 85/02; E05B 77/34; E05B 81/14; E05B 81/56;
(Continued)

(56) References Cited

U.S. PATENT DOCUMENTS 4,452,058 A * 6/1984 Noel ........................ E05B 81/06
292/201
5,236,234 A * 8/1993 Norman .................. E05B 81/06
292/201
(Continued)

FOREIGN PATENT DOCUMENTS

| JP | 7-293081 A | 7/1995 |
|---|---|---|
| JP | 4496273 B2 | 7/2010 |
| JP | 2012-012810 A | 1/2012 |

OTHER PUBLICATIONS

International Search Report issued in International Application No. PCT/JP2015/050136, dated Feb. 3, 2015, with English Translation.

*Primary Examiner* — Mark A Williams
(74) *Attorney, Agent, or Firm* — McDermott Will & Emery LLP

(57) ABSTRACT

The present invention relates to a vehicle latch device; a vehicle latch device (1) includes a switch plate (46), which is provided in a housing (23), and is able to conduct electricity to a motor (48) or another electrical component in the housing (23) other than the motor 48; and the switch plate (46) is formed separately from the housing (23) and formed by an electrically conductive plate being embedded in a synthetic resin 462 in a state where a portion thereof electrically conductive to the motor or electrical component and a connection terminal portion thereof to outside are exposed. The switch plate (46) is fixed in the housing 23 by engagement means 255, 256, 257, 464a, 465, and 467 that engage the synthetic resin 462 and the housing 23 with each other.

4 Claims, 17 Drawing Sheets

(51) Int. Cl.
    *E05B 85/02* (2014.01)
    *E05B 81/54* (2014.01)
    *E05B 15/16* (2006.01)
    *E05B 77/34* (2014.01)
    *E05B 79/20* (2014.01)
    *E05B 81/06* (2014.01)
    *E05B 81/16* (2014.01)
    *E05B 81/34* (2014.01)
    *E05B 81/70* (2014.01)

(52) U.S. Cl.
    CPC .............. *E05B 77/34* (2013.01); *E05B 79/20* (2013.01); *E05B 81/06* (2013.01); *E05B 81/16* (2013.01); *E05B 81/34* (2013.01); *E05B 81/54* (2013.01); *E05B 81/70* (2013.01); *E05B 85/02* (2013.01)

(58) Field of Classification Search
    CPC ...... E05B 81/16; E05B 15/1635; E05B 77/48; Y10T 70/5898; H05K 5/069; H05K 2201/0999; Y10S 310/06
    See application file for complete search history.

(56) References Cited

U.S. PATENT DOCUMENTS

| | | | | |
|---|---|---|---|---|
| 6,232,684 | B1* | 5/2001 | Haag | E05B 81/06 |
| | | | | 292/201 |
| 6,550,826 | B2* | 4/2003 | Fukushima | E05B 81/14 |
| | | | | 292/201 |
| 8,870,247 | B2* | 10/2014 | Yamagata | E05B 77/34 |
| | | | | 292/201 |
| 9,353,556 | B2* | 5/2016 | Margheritti | E05B 77/34 |
| 2012/0081844 | A1* | 4/2012 | Hill | B60K 37/00 |
| | | | | 361/679.01 |
| 2013/0160538 | A1* | 6/2013 | Taurasi | G01M 17/00 |
| | | | | 73/117.01 |
| 2014/0175813 | A1* | 6/2014 | Margheritti | E05B 77/34 |
| | | | | 292/201 |
| 2015/0361694 | A1* | 12/2015 | Zeabari | E05B 85/02 |
| | | | | 361/752 |
| 2017/0027070 | A1* | 1/2017 | Siddiqui | H02K 5/04 |

\* cited by examiner

VEHICLE DOOR LATCH DEVICE

CROSS-REFERENCE TO RELATED APPLICATIONS

This application is the U.S. National Phase under 35 U.S.C. § 371 of International application No. PCT/JP2015/050136, filed on Jan. 6, 2015, which claims the benefit of Japanese Application No. 2014-148040, filed on Jul. 18, 2014, the entire contents of each are hereby incorporated by reference.

FIELD

The present invention relates to a vehicle door latch device.

BACKGROUND

Conventional vehicle door latch devices include, as described in Patent Literature 1, for example, a device including: a body accommodating therein an engagement mechanism for restraining a door in a closed position by engaging with a striker on a vehicle body side; and a housing attached to the body and accommodating therein an operation mechanism including a motor that is able to perform switch-over between an unlocked state where an engaged state of the engagement mechanism with the striker is releasable and a locked state where the engaged state is unreleasable, with this housing accommodating therein: a detection switch for detecting the locked state and unlocked state of the door; and an electrical component, such as a switch plate electrically connected to the motor and the detection switch.

CITATION LIST

Patent Literature

Patent Literature 1: Japanese Patent No. 4496273

SUMMARY

Technical Problem

The switch plate of the door latch device described in the above cited Patent Literature 1 is, in consideration of waterproofness, assemblability and the like, integrally molded in a state where an electrically conductive plate is embedded in synthetic resin by insert molding, with a portion thereof connected to the detection switch and motor and a terminal portion thereof connected to an external connector being exposed. Further, in the door latch device described in the above cited Patent Literature 1, since the switch plate is firmly fixed to the housing without use of a fixing means, such as screws, the switch plate formed by insert molding is integrally molded with the housing by further insert molding. Accordingly, two insert molding steps are needed, including a first step of forming the switch plate itself by insert molding, and a second step of integrally molding this switch plate with the housing by further insert molding, and thus manufacturing cost for molds and the like and manhours required in these insert molding steps are increased, causing cost of the door latch device to be increased.

Further, for the conventional door latch device, in consideration of moldability and the like upon the insert molding of the switch plate with the housing, a comparatively expensive synthetic resin material, which is made by adding glass fiber to a resin mixture of a polybutyrene terephthalate resin (PBT resin) and an acrylonitrile butadiene styrene resin (ABS resin), is used as a molding material thereof, and thus, there also has been a problem that material cost upon molding of the housing is increased.

In view of the above described problems, an object of the present invention is to provide a vehicle door latch device that achieves reduction of cost by enabling a switch plate thereof to be stably attached to a housing thereof.

Solution to Problem

According to the present invention, the above problems are resolved as follows. In the first invention, a vehicle door latch device includes: a body accommodating therein an engagement mechanism, which restrains a door in a closed position by engaging with a striker; a housing, which is attached to the body, accommodating therein an operation mechanism, which includes a motor, which is able to perform switch-over between an unlocked state, where an engaged state of the engagement mechanism with the striker is releasable, and a locked state, where the engaged state is unreleasable; and a switch plate, which is provided in the housing and is able to conduct electricity to the motor or any other electrical component, which is provided in the housing, other than the motor. Further, the switch plate is formed separately from the housing, and is formed by embedding an electrically conductive plate of the switch plate into a synthetic resin in a state where an electrically conductive portion, which is to be connected to the motor or any other electric component other than the motor, and an connection terminal portion, which is to be connected outside, of the electrically conductive plate are exposed, and the switch plate is fixed in the housing by an engagement means, that engages the synthetic resin and the housing with each other.

In the second invention, according to the vehicle door latch device in the first invention, a female connector portion, to which an external connector is connectable, is integrally molded with the switch plate by use of a synthetic resin for insert molding, with the connection terminal portion being exposed inside the female connector portion.

In the third invention, according to the vehicle door latch device according the first or second invention, the engagement means includes an engaged portion, which is provided in plural positions along a longitudinal direction of the synthetic resin in the switch plate, and an engagement portion, which is provided in the housing, and the engagement portion is engageable with the engaged portion.

In the fourth invention, according to the second invention, an engaged portion and an engagement portion, which are engageable with each other, are further provided in the female connector portion and the housing.

In the fifth invention, according to any one of the first through the fourth inventions, an attachment portion for a detection switch, which is the electrical component, is integrally molded with the switch plate, by use of a synthetic resin for insert molding.

Advantageous Effects of Invention

According to the present invention, a switch plate, which is formed separately from a housing by insert molding, is able to be stably fixed, without loosening, to the housing by only an engagement means, without use of a fixing means, such as screws. Therefore, the conventional second step of integrally molding the switch plate with the housing by further insert molding is not needed. Accordingly, manufacturing cost for molds and man-hours are reduced, and cost of the door latch device is able to be reduced.

DESCRIPTION OF EMBODIMENTS

Hereinafter, an embodiment of the present invention will be described, based on the drawings.

As illustrated in FIG. 1 to FIG. 7, a door latch device 1 includes, in a front door (hereinafter, abbreviated as "door") D on a left side of a vehicle: an engagement unit 2, which is fixed to a rear end portion of an inner panel D1 of the door D; an operation unit 3, which is integrally coupled with the engagement unit 2; and an actuator 4, which is provided in the operation unit 3.

Figure 1:
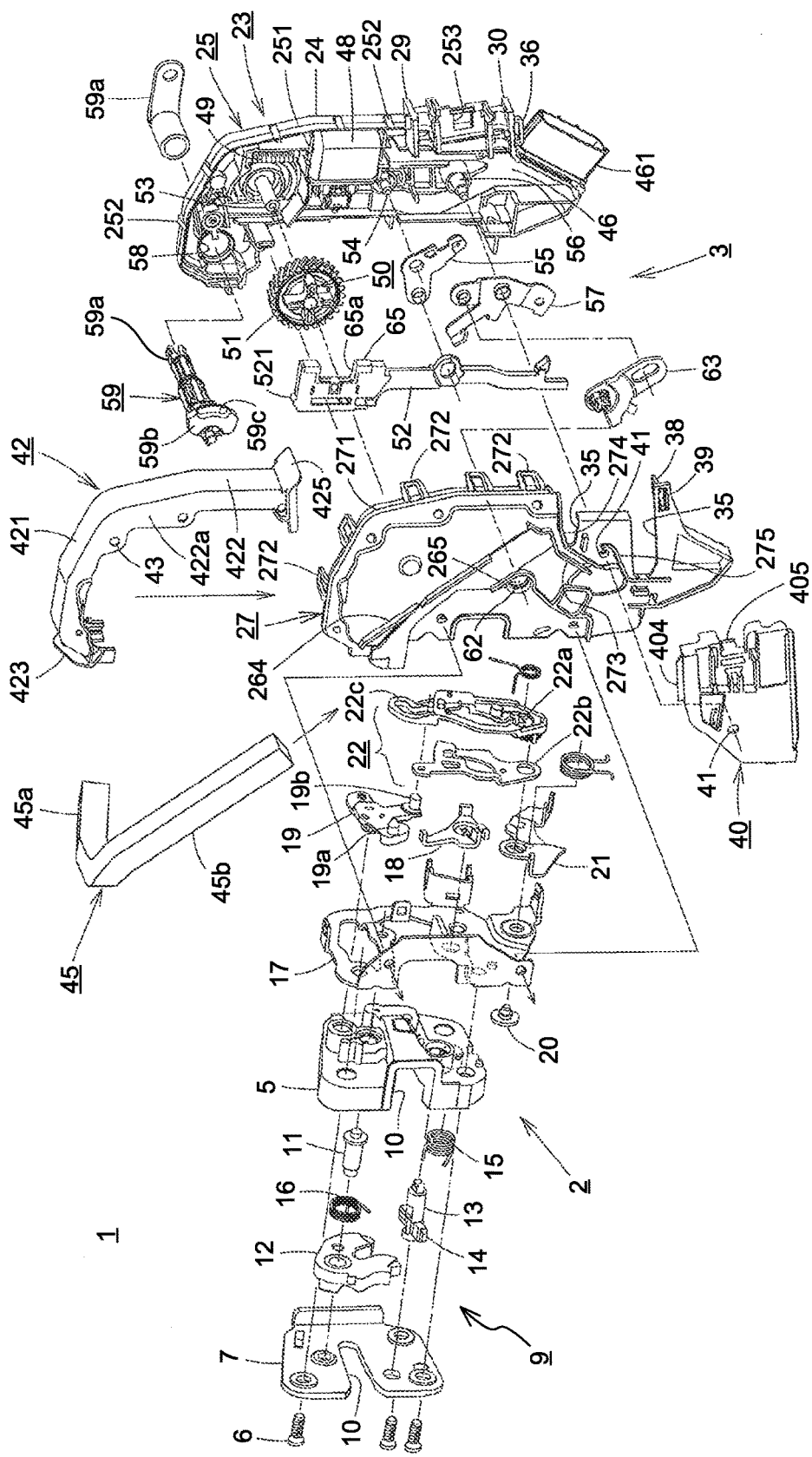
FIG. 1 is an exploded perspective view illustrating an embodiment of a door latch device of the present invention.
Figure 2:
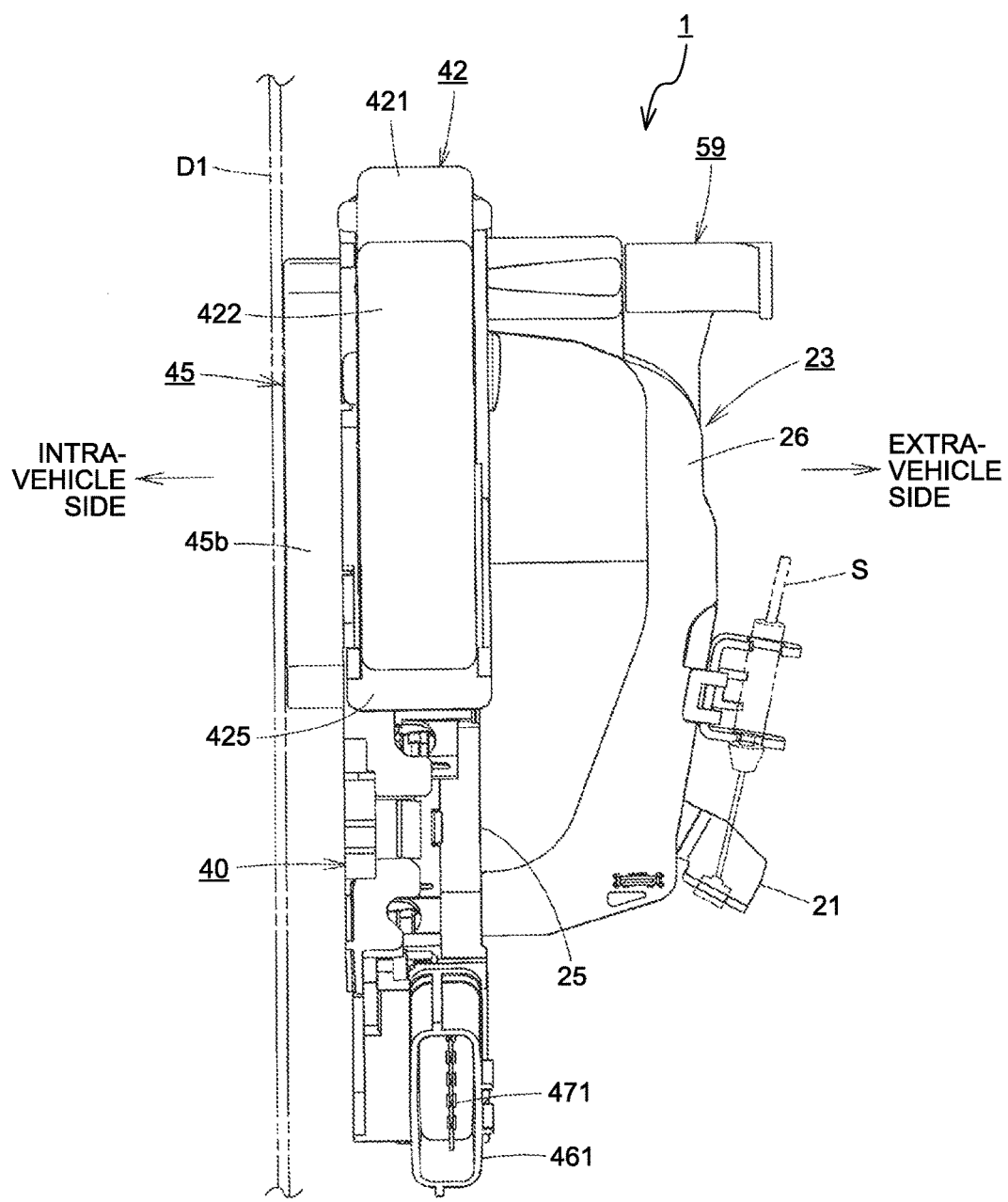
FIG. 2 is a front view of the door latch device in FIG. 1 that has been assembled, as viewed from the front of a vehicle.
Figure 3:
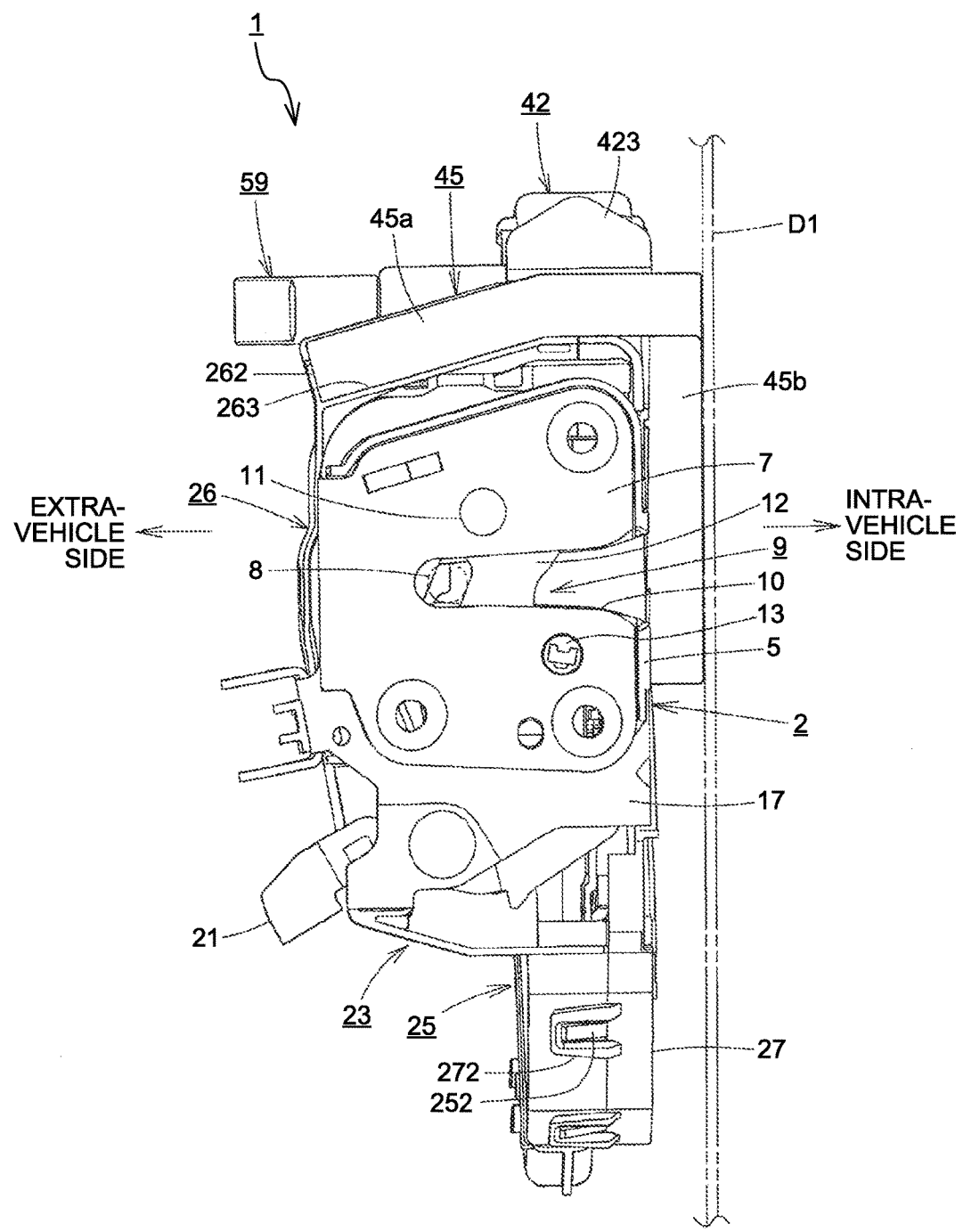
FIG. 3 is a rear view of the same door latch device.

As illustrated in FIG. 1 and FIG. 3, the engagement unit 2 includes: a body 5, which is made of a synthetic resin and is box-shaped; and a cover plate 7, which is fixed to a rear surface of the body 5, is fixed, together with the body 5, by a plurality of bolts 6, to a rear portion of the inner panel D1 in the door D, and is made of metal. In an internal space between the body 5 and the cover plate 7, an engagement mechanism 9, for restraining the door in a closed state, is accommodated. In the body 5 and the cover plate 7, a striker advancing groove 10, into which a striker 8 advances in response to the door D being closed, is formed.

The engagement mechanism 9 includes a latch 12 and a locking plate 14. The latch 12 is biased in an opening direction by a spring 16, which is wound around a pivot shaft 11. The latch 12 is pivotally supported by the pivot shaft 11 in the body 5 and is engaged with and disengaged from the striker 8, which is provided on an extra-vehicle side. The latch 12 is biased in the opening direction by the spring 16, which is wound around the pivot shaft 11. The locking plate 14 prevents pivoting of the latch 12 in the opening direction (counterclockwise direction in FIG. 3).

After, in association with the latch 12 pivoting from an open position to a closed position, the latch 12 has been pivoted once, from an engaged position where the latch 12 is engaged with the striker 8, in a releasing direction against a biasing force of a spring 15, that biases the locking plate 14 in an engaging direction, the locking plate 14 engages with an outer peripheral edge of the latch 12 by the biasing force of the spring 15 to prevent pivoting of the latch 12 in the opening direction. Further, when a later described opening lever 18 is release actuated based on an operation of an outside handle (illustration thereof omitted) for opening the door, the outside handle provided on the extra-vehicle side of the door D, or of an inside handle (illustration thereof omitted) provided on the intra-vehicle side thereof, the locking plate 14 pivots in the releasing direction from an engaged position where the locking plate 14 is engaged with the outer peripheral edge of the latch 12, so that the door becomes openable.

On a front surface side of the body 5, a base plate 17, which is fixed to a housing 23, which is described later, is L-shaped in its planar view and is made of metal, is attached. Further, on the front surface side of the body 5: the opening lever 18, that is fixed to a pivot shaft 13 so as to integrally pivot with the locking plate 14; a locking/unlocking lever 19, that forms a part of a locking/unlocking mechanism; an outside lever 21, that is pivotally supported by a pivot shaft 20 and that is coupled to the outside handle on the extra-vehicle side of the door via an operating force transmission member S; and a sub lever 22, that is disposed between the locking/unlocking lever 19 and the outside lever 21 and forms a part of the locking/unlocking mechanism, are installed. The sub lever 22 has a first lever 22a and a second lever 22b. A lower end portion of the first lever 22a is pivotally fitted to a free end portion of the outside lever 21. An elongated hole 22c, which is extended in an up-down direction and provided in an upper end portion of the first lever 22a, is slidably coupled to a protruding portion 19b, which is provided at a lower end portion of the locking/unlocking lever 19.

The locking/unlocking lever 19 is able to be switched over between a locked state and an unlocked state based on an operation of a locking knob (illustration thereof omitted), which is provided on the vehicle intra-vehicle side of the door and is provided for an locking/unlocking operation and an operation of a key cylinder (illustration thereof omitted) provided on the extra-vehicle side of the door. A lower end portion of the second lever 22b is pivotally fitted to the lower end portion of the first lever 22a.

A coupling portion 19a of the locking/unlocking lever 19, the coupling portion 19a being provided on a front surface of the locking/unlocking lever 19 and being directed to the front, is coupled to a later described actuation member 52 of the actuator 4 when the engagement unit 2 is attached to the operation unit 3. Thereby, in synchronization with actuation of the actuation member 52, the locking/unlocking lever 19 is able to be switched over between the locked state and the unlocked state.

The operation unit 3 includes the housing 23, which is substantially L-shaped in its planar view and is made of a synthetic resin. The housing 23 includes a first case 25, a second case 26, and a cover 27, which is made of a synthetic resin. The first case 25 is arranged adjacent to a side surface of the inner panel D1 in the door D and includes an operation mechanism accommodating portion 24 with the intra-vehicle side thereof being open. The second case 26 is a body accommodating portion, which extends from a rear end portion of an up-down direction intermediate portion of the first case 25, substantially perpendicularly thereto in an outward direction of the vehicle, and to which the engagement unit 2 is fixed to a rear surface side thereof. The cover 27 closes an opening of the operation mechanism accommodating portion 24 of the first case 25 with the vicinity of the striker advancing groove 10 of the body 5 in the engagement unit 2 being exposed. In the operation mechanism accommodating portion 24 of the first case 25, a later described operation mechanism 28, which includes the actuator 4, and electrical components, such as a switch plate 46, and switches 60 and 61, are installed. The housing 23 excluding the cover 27 is molded of, for example, a polyacetal resin (POM), which is comparatively inexpensive and hard.

In an upper portion of the operation mechanism accommodating portion 24 of the first case 25, an outer peripheral wall 251, which protrudes in the outward direction of the vehicle, is formed, and plural protruding portions 252 are formed on an outer surface of this outer peripheral wall 251. Further, on an outer peripheral wall 271 of the cover 27, the outer peripheral wall 271 facing the outer peripheral wall 251 of the first case 25, plural engagement pieces 272, which are engageable with the protruding portions 252, are provided in a protruding manner. After the operation mechanism 28 is installed in the operation mechanism accommodating portion 24, by the engagement pieces 272 being engaged with the respective protruding portions 252 of the operation mechanism accommodating portion 24 and the outer peripheral walls 251 and 271 being caused to tightly contact each other, the cover 27 is fixed to the first case 25 so as to cover the operation mechanism 28, which is accommodated in the operation mechanism accommodating portion 24.

Figure 7:
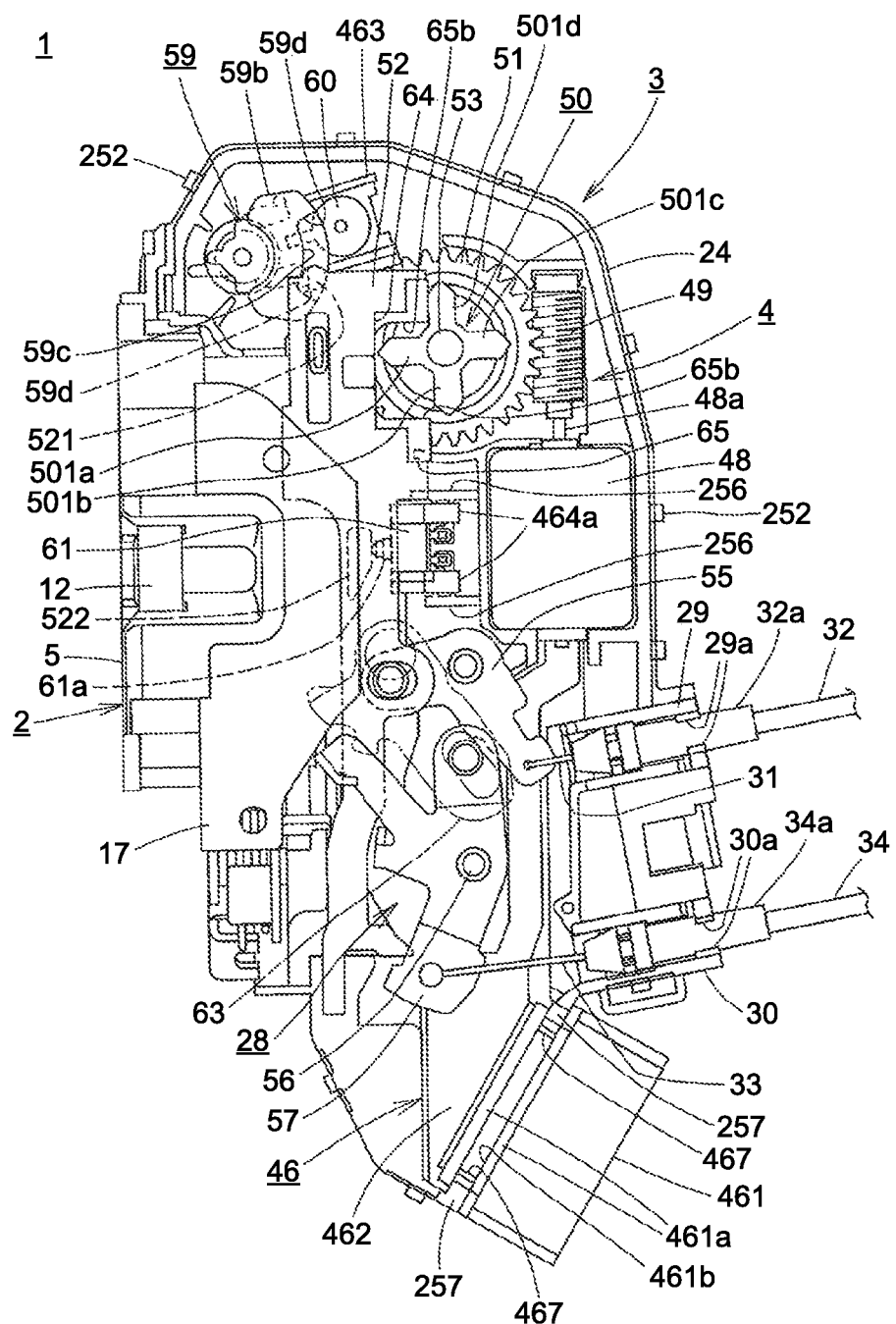
FIG. 7 is a left side view of the same door latch device in a state where a cover has been removed therefrom.

As illustrated in FIG. 1 and FIG. 7, at a front lower portion of the operation mechanism accommodating portion 24 in the first case 25, two upper and lower conduit fixing portions 29 and 30, which are concave shaped with their intra-vehicle sides open, are provided. Front end portions of these conduit fixing portions 29 and 30 protrude more forward than front surfaces of the first case 25 and a top waterproof cover 42, which is described later. On inner wall surfaces of both of the conduit fixing portions 29 and 30, the inner wall surfaces being opposite to each other, elastic claw pieces 29a and 29a, and 30a and 30a, which are elastically deformable in a direction orthogonal to an arrangement direction of conduits 32 and 34, which are described later, are respectively provided in a protruding manner.

To the upper conduit fixing portion 29, a large diameter end portion 32a of the conduit 32, through which a cable 31 is inserted, is fitted, and the large diameter end portion 32a is fixed by the elastic claw pieces 29a and 29a. One end of the cable 31 is coupled to the locking knob (illustration thereof omitted), which is provided on the intra-vehicle side of the door and provided for the locking/unlocking operation, and the other end thereof is coupled to a knob lever 55, which is described later, respectively. To the lower conduit fixing portion 30, a large diameter end portion 34a of the conduit 34, through which a cable 33 is inserted, is fitted, and the large diameter end portion 34a is fixed by the elastic claw pieces 30a and 30a. One end of the cable 33 is coupled to the inside handle (illustration thereof omitted) on the intra-vehicle side, and the other end thereof is coupled to an inside lever 57, which is described later.

Figure 8:
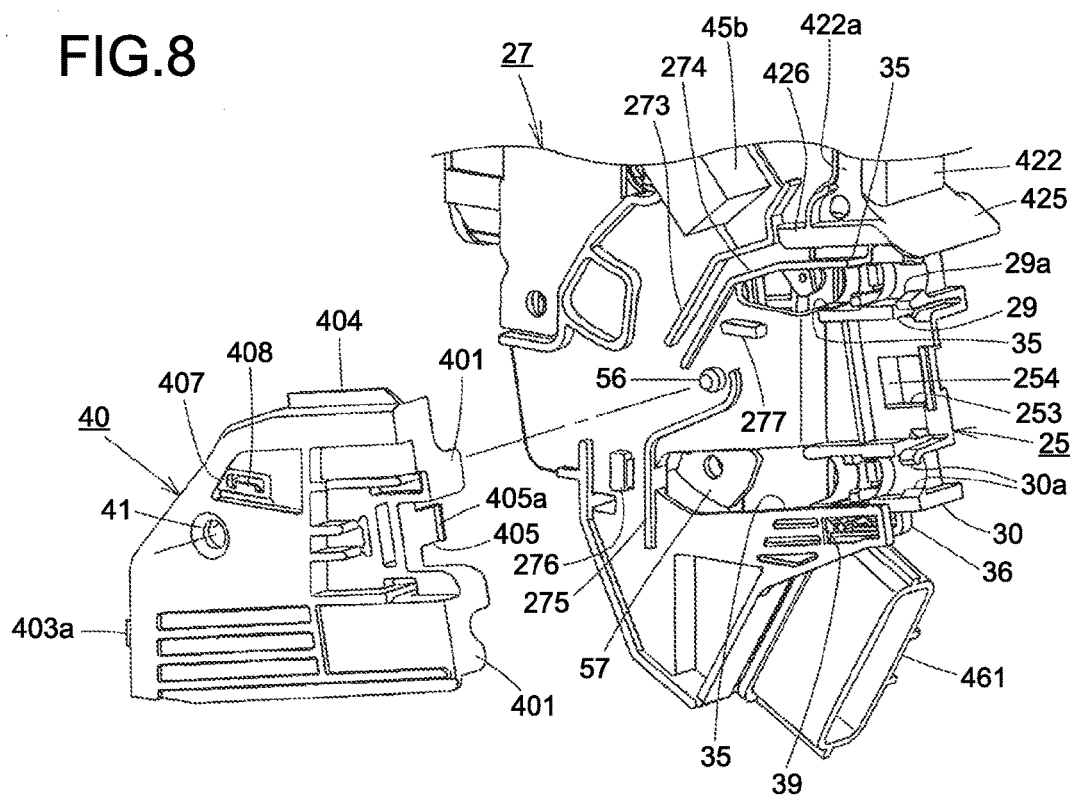
FIG. 8 is an enlarged perspective view of main parts before attachment of an auxiliary cover to the cover.

As illustrated in FIG. 1 and FIG. 8, in a portion of the cover 27, the portion being opposite to the conduit fixing portions 29 and 30 of the first case 25, openings 35 and 35, which are open in an intra-extra vehicle direction and forward, are formed. The large diameter end portions 32a and 34a of the conduits 32 and 34 are fitted into the conduit fixing portions 29 and 30 through these upper and lower openings 35. A dimension of forward protrusion of the cover 27 between the upper and lower openings 35 and 35 is very small.

Figure 4:
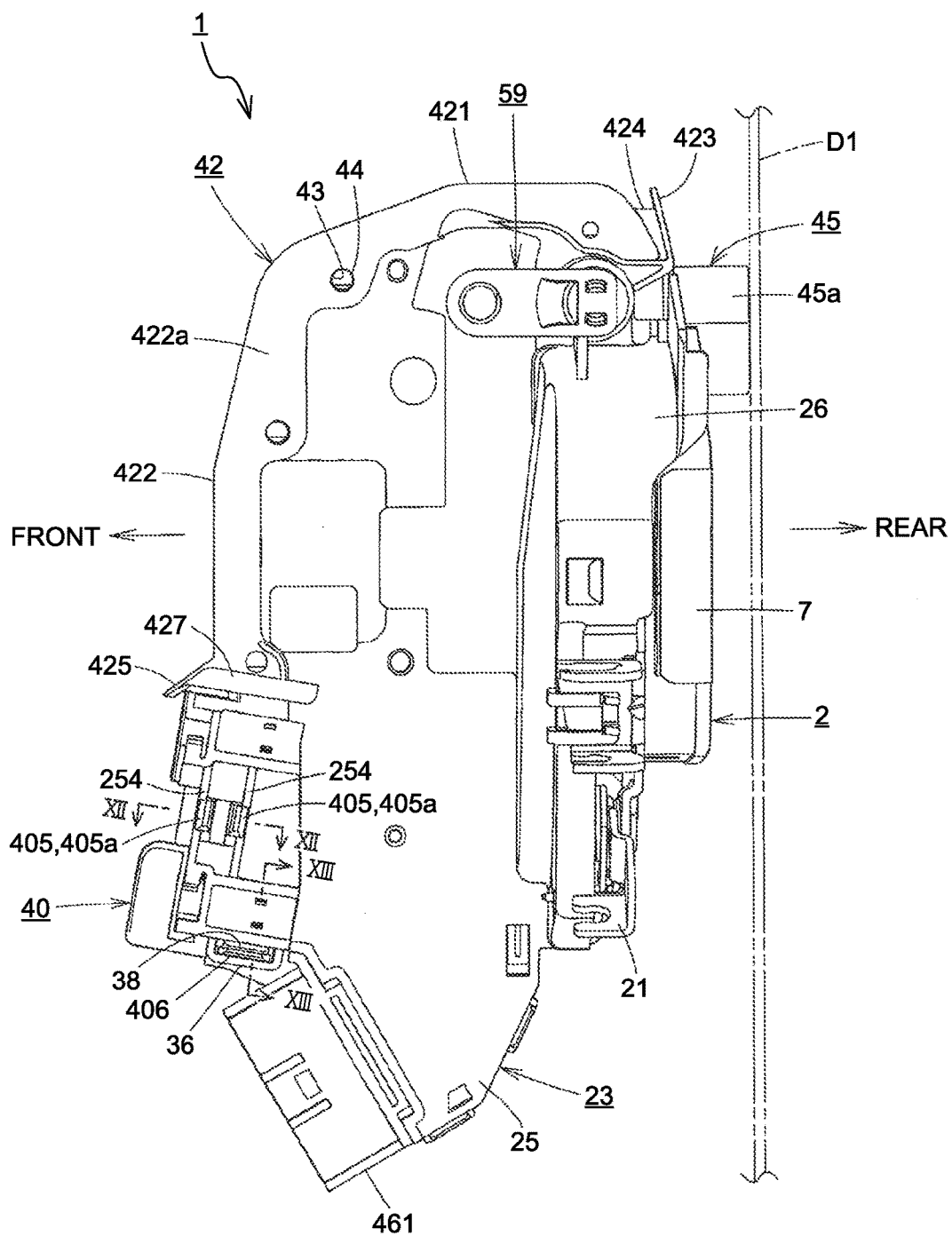
FIG. 4 is a right side view of the same door latch device.
Figure 13:
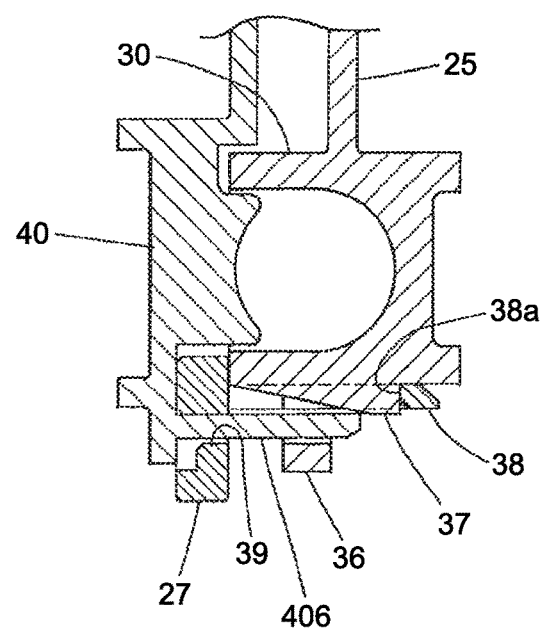
FIG. 13 is an enlarged cross sectional view along a line XIII-XIII in the same figure.

As illustrated in FIG. 1, FIG. 4, and FIG. 13, on a lower surface of the lower conduit fixing portion 30, a holding piece 36 and an engagement protruding portion 37 are formed, the holding piece 36 being open in the intra-extra vehicle direction and U-shaped in its side view, and the engagement protruding portion 37 being gradually sloped downwards in the outward direction of the vehicle. In a front lower portion of the cover 27, the front lower portion being opposite to the holding piece 36, an elastic engagement piece 38, which includes an engagement hole 38a, is provided in a protruding manner in the outward direction of the vehicle. When the cover 27 is attached to the first case 25, this elastic engagement piece 38 is fitted to the holding piece 36, and the engagement hole 38a is elastically engaged with the engagement protruding portion 37, and thereby, a lower portion of the cover 27 is fixed to the first case 25. Slightly below the elastic engagement piece 38 in the cover 27, a fitting hole 39, into which an insertion piece 406 of an auxiliary cover 40, described later, is fittable and which is oblong, is formed oppositely to an internal space of the holding piece 36.

As illustrated in FIG. 1 and FIG. 8, on a lower side surface on the intra-vehicle side of the cover 27, a first rainwater guide protruding portion 273, a second rainwater guide protruding portion 274, and a third rainwater guide protruding portion 275, which are for preventing rainwater flowing down along a side surface on the intra-vehicle side of the cover 27 from heading towards the upper and lower openings 35 by guiding the rainwater, and which are rib shaped, are provided in a protruding manner in an inward direction of the vehicle. The first rainwater guide protruding portion 273 is formed at a position slightly separated from a rear portion side of the upper opening 35, so as to be sloped from the upper front to the lower rear. The second rainwater guide protruding portion 274 is formed to be continuous with an upper edge of the upper opening 35 at a portion slightly separated from and below the first rainwater guide protruding portion 273, and to be sloped to the lower rear with a predetermined interval kept from the first rainwater guide protruding portion 273. The third rainwater guide protruding portion 275 is formed to be sloped to the upper front, above a rear portion side of the lower opening 35 and below a rear portion side of the second rainwater guide protruding portion 274, and such that a lower half portion of the third rainwater guide protruding portion 275 extends substantially vertically downwards at the rear of and adjacently to the lower opening 35.

Figure 14:
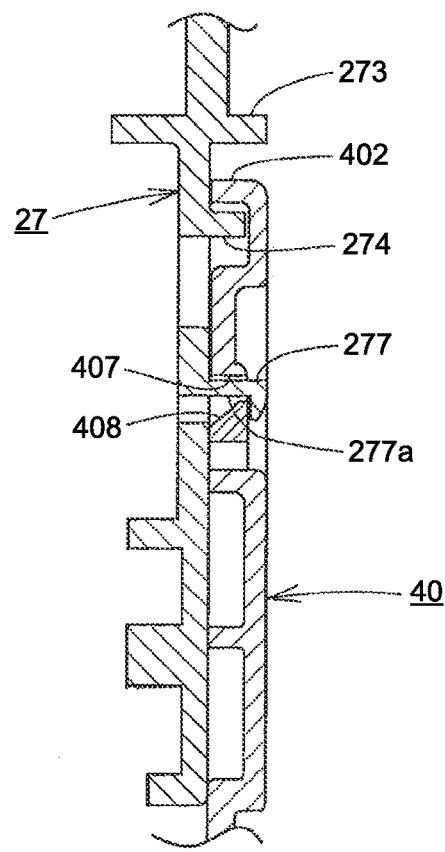
FIG. 14 is an enlarged cross sectional view along a line XIV-XIV in FIG. 5.

The rainwater flowing down along the side surface on the intra-vehicle side of the cover 27 is received by the first and second rainwater guide protruding portions 273 and 274 and guided to the lower rear. Rainwater flowing down from lower ends of the first and second rainwater guide protruding portions 273 and 274 is received by the third rainwater guide protruding portion 275 and guided towards a lower end of the cover 27. Therefore, there will be no risk that rainwater that has entered the door will enter the housing 23 from the upper and lower openings 35 along the side surface on the intra-vehicle side of the cover 27. An outer peripheral wall portion 402 of the auxiliary cover 40, described later, is inserted between the first rainwater guide protruding portion 273 and the second rainwater guide protruding portion 274. Due to the labyrinth action formed by the first and second rainwater guide protruding portions 273 and 274 and the outer peripheral wall portion 402 of the auxiliary cover 40, rainwater is prevented from entering into the openings 35 (see FIG. 14).

On the lower side surface on the intra-vehicle side of the cover 27, the auxiliary cover 40, which closes the upper and lower openings 35 to prevent rainwater from entering therefrom and is made of synthetic resin, is installed. As enlarged and illustrated in FIG. 5 and FIG. 8 to FIG. 10, the auxiliary cover 40 is roughly trapezoidal in its side view with a size that is able to close, with allowance, the upper and lower openings 35 of the cover 27 and the upper and lower conduit fixing portions 29 and 30 of the first case 25. At upper and lower portions of a front end portion of the auxiliary cover 40, pressing pieces 401 and 401, which are able to press an outer peripheral surface on the intra-vehicle side of the large diameter end portions 32a and 34a of the conduits 32 and 34 fitted to the conduit fixing portions 29 and 30, are formed. The upper and lower pressing pieces 401 on the front end side also serve as a cover that covers front side openings of the conduit fixing portions 29 and 30 from the front and leaving insertion portions of the conduits 32 and 34.

Figure 10:
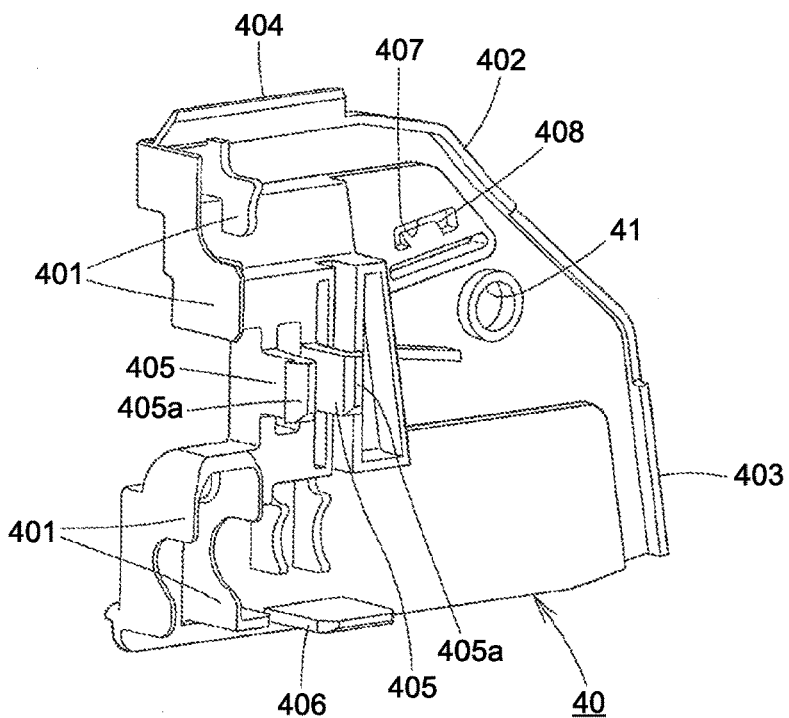
FIG. 10 is an enlarged perspective view of the auxiliary cover as viewed from a back surface thereof.

As illustrated in a back view of FIG. 10, at an upper portion of the auxiliary cover 40, the outer peripheral wall portion 402, which is inserted between the above described first rainwater guide protruding portion 273 and second rainwater guide protruding portion 274, has an outer end surface abuttable against the side surface on the intra-vehicle side of the cover 27, and is rib-shaped, is formed. At a lower portion of a rear edge of the auxiliary cover 40, an outer peripheral wall portion 403, which has an outer end surface abuttable against the side surface on the intra-vehicle side of the cover 27, at the rear of and adjacently to the above described third rainwater guide protruding portion 275, and is rib-shaped, is formed. Each of the outer peripheral wall portions 402 and 403 is formed in the outward direction of the vehicle. Further, an upward protruding piece 404, which is covered by a later described intra-vehicle side water shielding wall portion 426 of the top waterproof cover 42 and is in a front-rear direction, is integrally formed with an upper end continuous with the outer peripheral wall portion 402.

Between the upper and lower pressing pieces 401 and 401, on a back surface (surface on the extra-vehicle side) of the front end portion of the auxiliary cover 40, a pair of front and rear elastic engagement pieces 405 and 405, which have, at distal end portions thereof, respective engagement claw portions 405a, which are directed in opposite directions (outward directions) from each other, are provided in a protruding manner in the outward direction of the vehicle. When the auxiliary cover 40 is attached to the cover 27, as illustrated in FIG. 8, these elastic engagement pieces 405 are fitted into a rectangular opening 253, which is formed in a front end portion of the first case 25 between the upper and lower conduit fixing portions 29 and 30. Upon this fitting, the engagement claw portions 405a are elastically engaged with end faces on the extra-vehicle side of a pair of engagement pieces 254 and 254, which protrudes in the outward direction of the vehicle from front and rear opening edges of the opening 253 (see FIG. 12).

At a lower end portion on the back surface of the auxiliary cover 40, the insertion piece 406, which is directed in the outward direction of the vehicle and is for positioning, is provided in a protruding manner. When the auxiliary cover 40 is attached to the cover 27, this insertion piece 406 penetrates through the fitting hole 39 of the cover 27 and is fitted to the above described U-shaped holding piece 36 in the first case 25 (see FIG. 13).

Figure 5:
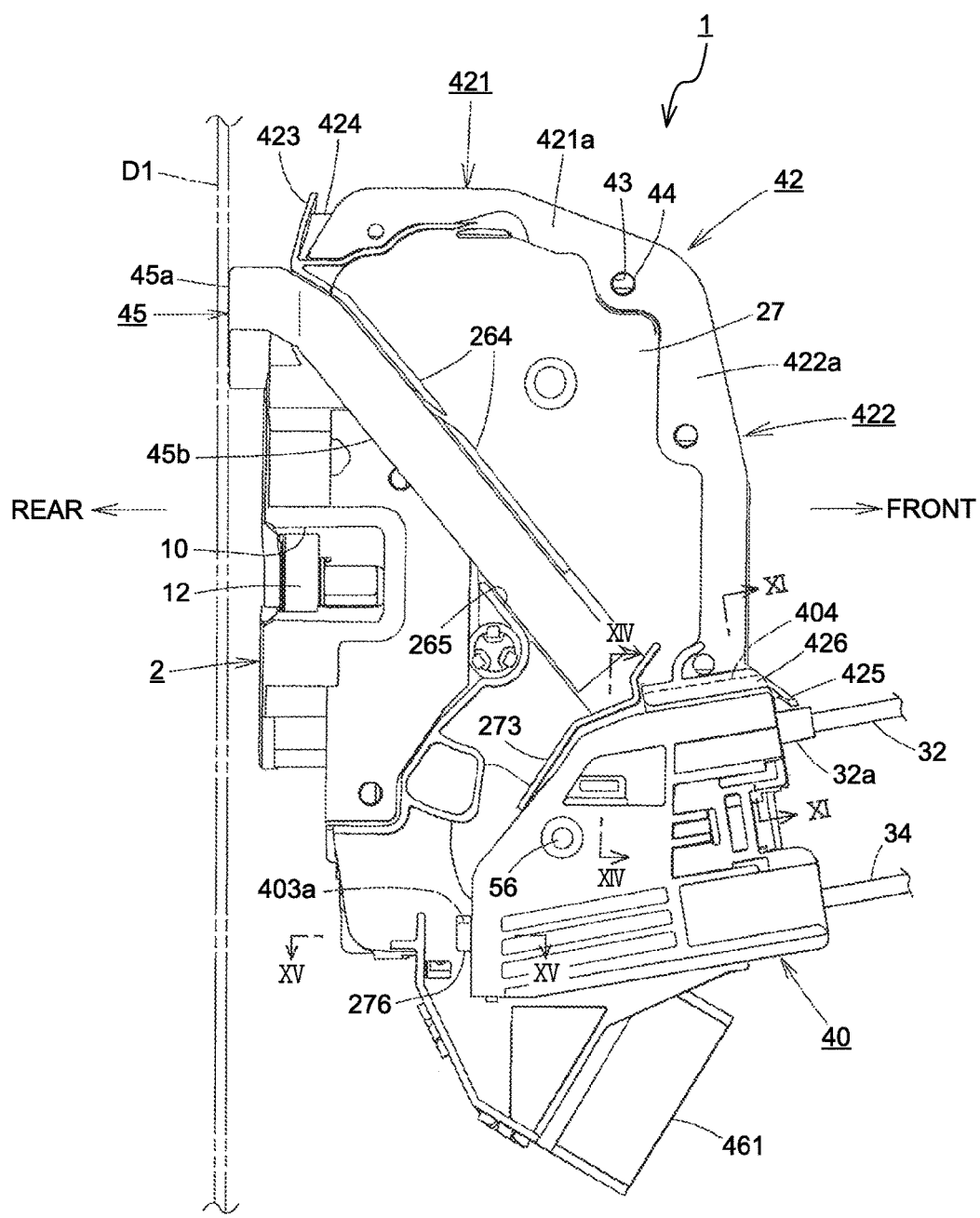
FIG. 5 is a left side view of the same door latch device.
Figure 9:
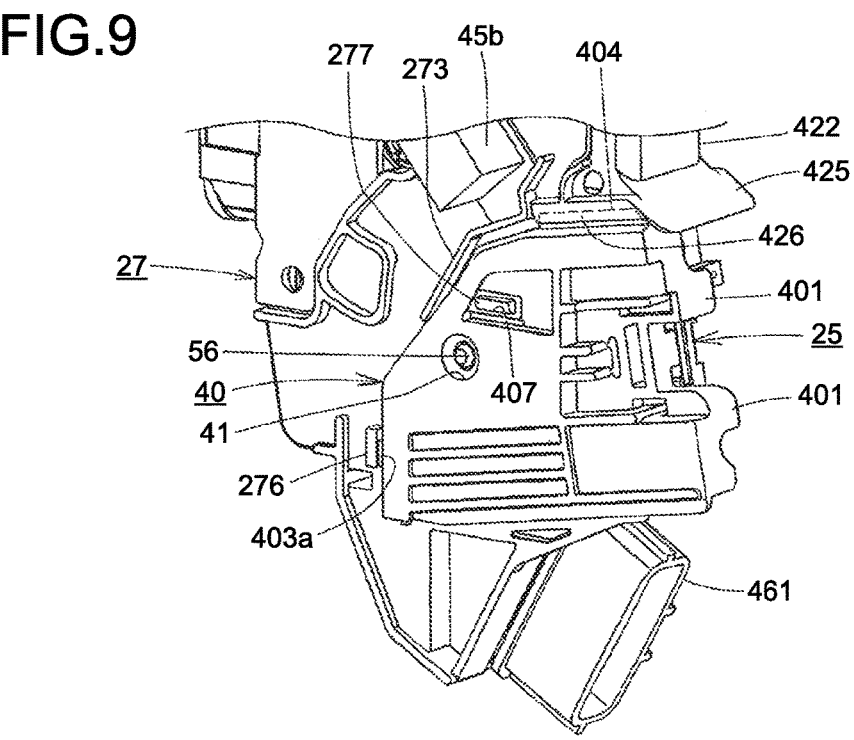
FIG. 9 is an enlarged perspective view after the attachment of the same auxiliary cover.
Figure 15:
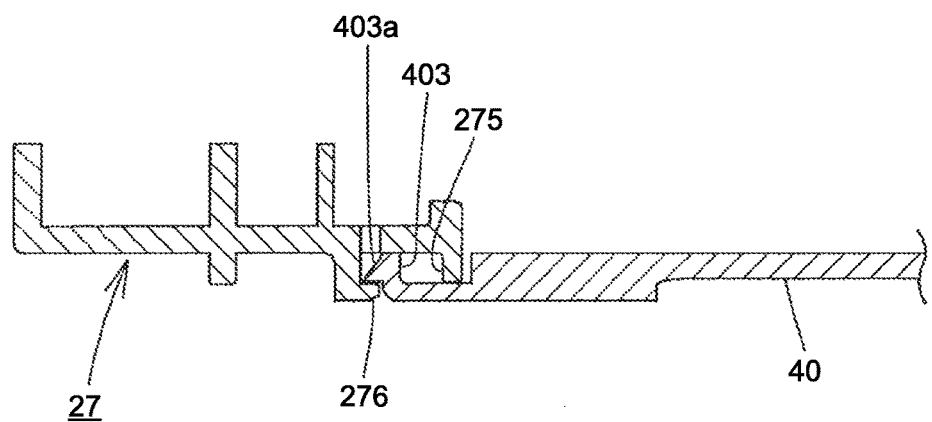
FIG. 15 is an enlarged cross sectional view along a line XV-XV in the same figure.

On a rear surface of the outer peripheral wall portion 403 at the lower portion of the auxiliary cover 40, an engagement claw 403a is provided in a protruding manner. This engagement claw 403a is engageable with a reverse surface (surface on the extra-vehicle side) of an engagement protruding portion 276, which is, as illustrated in FIG. 5, FIG. 8, and FIG. 9, formed to protrude to the intra-vehicle side at a rear end lower portion of the cover 27 and has an L-shaped cross section in its planar view, when the auxiliary cover 40 is attached to the cover 27 (see FIG. 15).

As illustrated in FIG. 8 and FIG. 10, in a top portion rearward in the auxiliary cover 40, an engagement hole 407, which is oblong, is formed. At a central portion on an upper surface in this engagement hole 407, an engagement protruding portion 408, which has a short dimension than a vertical dimension of the engagement hole 407 and is directed upward, is formed. On a surface on the intra-vehicle side of the cover 27, which is opposite to this engagement hole 407, a fitting protruding portion 277, fittable into the engagement hole 407, is provided in a protruding manner. On a lower surface of this fitting protruding portion 277, as illustrated in a cross sectional view in FIG. 14, an engagement hole 277a, with which the engagement protruding portion 408 is engageable from therebelow and which is recessed upward, is formed. Shaft holes 41 and 41, into which a distal end portion of a support shaft 56 of the later described inside lever 57, provided in the first case 25, is fitted, are provided in the cover 27 and the auxiliary cover 40 (see FIG. 1).

Figure 12:
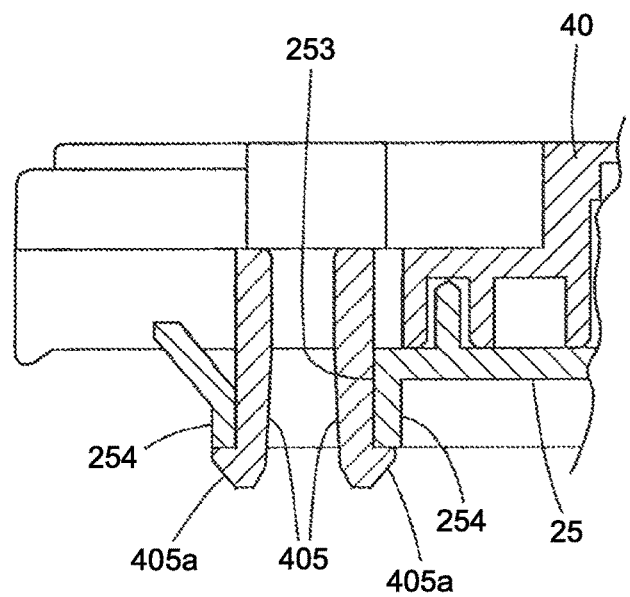
FIG. 12 is an enlarged inner side view along a line XII-XII in FIG. 4.

To attach the auxiliary cover 40 to the cover 27, the pair of elastic engagement pieces 405, provided in the auxiliary cover 40, are fitted into the opening 253 of the first case 25, and the engagement claw portions 405a of both the elastic engagement pieces 405 are elastically engaged with the respective engagement pieces 254 of the first case 25 (see FIG. 12). The engagement claw 403a, which is on a rear side of the auxiliary cover 40, is engaged with the reverse surface of the engagement protruding portion 276 of the cover 27 (see FIG. 15), and further, the engagement hole 407 in the rear upper portion of the auxiliary cover 40 is fitted to the fitting protruding portion 277 of the cover 27, and the engagement protruding portion 408 in the engagement hole 407 is engaged with the engagement hole 277a of the fitting protruding portion 277 (see FIG. 14). Further, simultaneously therewith, the insertion piece 406 at the lower end portion of the auxiliary cover 40 is penetrated through the fitting hole 39 of the cover 27 and fitted to the U-shaped holding piece 36 in the first case 25 (see FIG. 13).

Thereby, even without a use of a fixing means, such as screws, the auxiliary cover 40 is able to be attached, without loosening, to be unmovable in any direction, to the first case 25 and the cover 27 of the housing 23, so as to abut against or be adjacent to the side surface on the intra-vehicle side of the cover 27, in a state of being sloped slightly to the upper front. Further, since the upper and lower conduit fixing portions 29 and 30 of the first case 25 and the upper and lower openings 35 of the cover 27 are closed by the auxiliary cover 40, there will be no risk that rainwater flowing down along the side surface on the intra-vehicle side of the cover 27 will enter the housing 23. Furthermore, as described above, by the labyrinth action formed by the first and second rainwater guide protruding portions 273 and 274 and the outer peripheral wall portion 402 of the auxiliary cover 40, rainwater flowing down along the side surface on the intra-vehicle side of the cover 27 is also prevented from entering the housing 23 from a gap between the cover 27 and the auxiliary cover 40. After the attachment of the auxiliary cover 40, since a visor-like front side water shielding wall portion 425 of the later described top waterproof cover 42 is positioned directly above the front end portion of the auxiliary cover 40, rainwater is prevented from entering the housing 23 from insertion portions of the conduits 32 and 34 in the conduit fixing portions 29 and 30 (see FIG. 5 and FIG. 9).

As illustrated in FIG. 1 to FIG. 6, FIG. 16, and FIG. 17, in an area from an upper surface of the first case 25 and the cover 27 in the housing 23 to the upper conduit fixing portion 29, the top waterproof cover 42, which is for preventing rainwater from entering the operation mechanism accommodating portion 24 of the first case 25 and is made of synthetic resin, is provided. This top waterproof cover 42 is integrally formed of an upper side covering portion 421, with a rear surface thereof slightly sloped rearward, and a front side covering portion 422. The upper side covering portion 421 covers the whole area of an upper surface and a front and rear vertical surfaces near the upper surface, of the operation mechanism accommodating portion 24 and the cover 27. The front side covering portion 422 covers a substantial upper half of a front surface and a vertical surface near the front surface, of the operation mechanism accommodating portion 24 and the cover 27.

Figure 11:
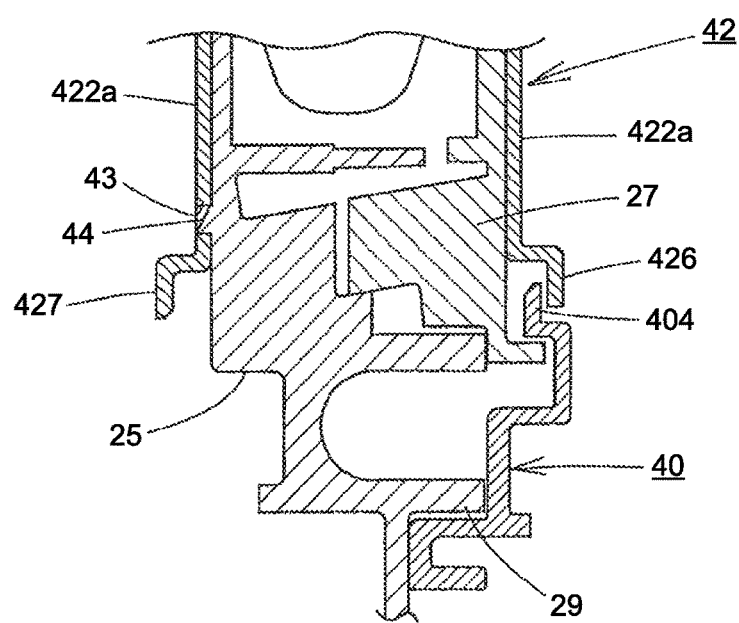
FIG. 11 is an enlarged cross sectional view along a line XI-XI in FIG. 5.

Plural fitting holes 43 are formed in a pair of front and rear downward pieces 421a of the upper side covering portion 421 and a pair of front and rear rearward pieces 422a of the front side covering portion 422, and these fitting holes 43 are engaged with plural protruding portions 44 provided on an outer surface of the first case 25 and the cover 27. Thereby, the top waterproof cover 42 covers a top portion and a front portion of a joint between the first case 25 and the cover 27, and is fixed so as to sandwich a top portion of the first case 25 and the cover 27 (see FIG. 11).

Figure 6:
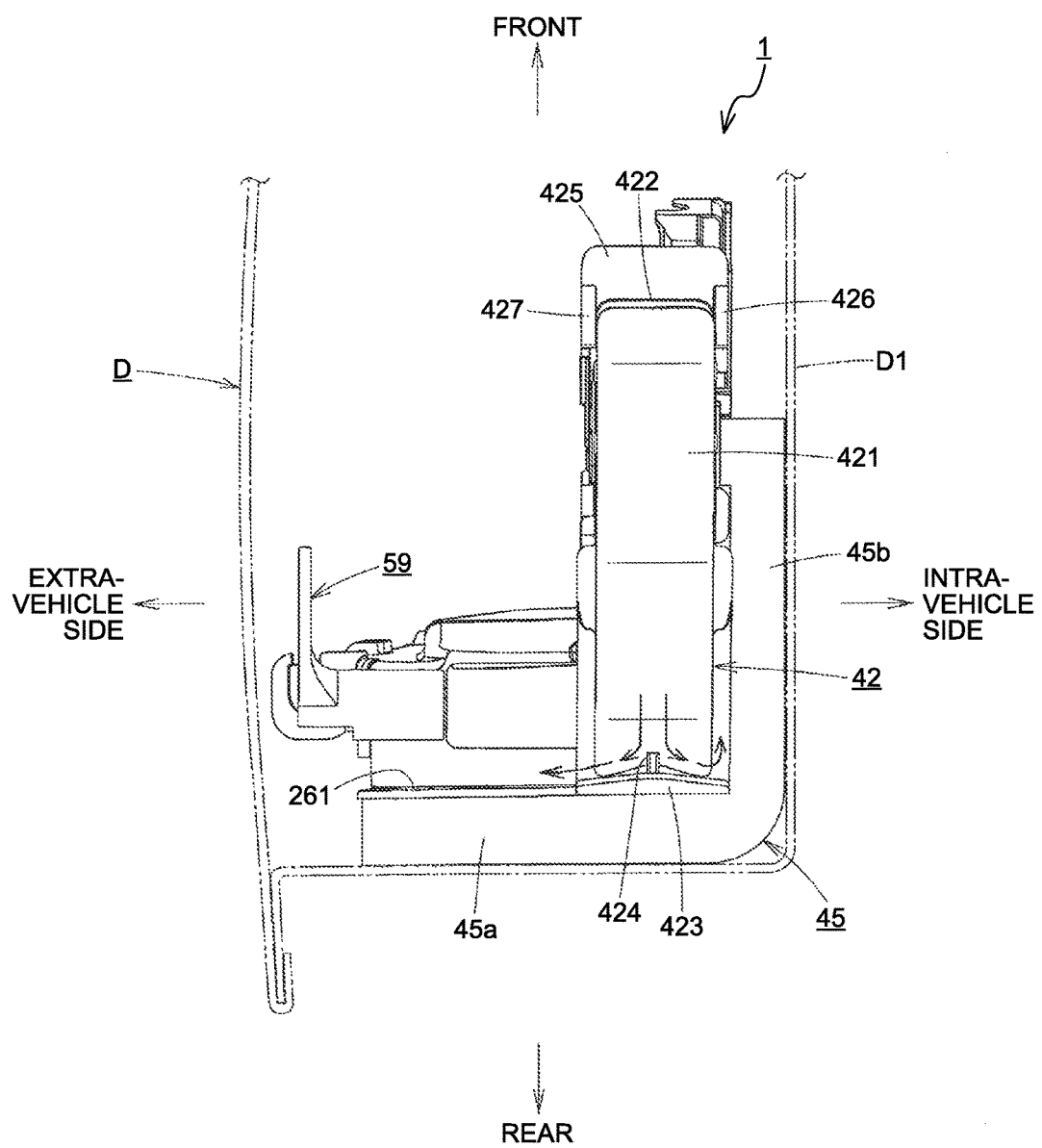
FIG. 6 is a plan view of the same door latch device.
Figure 16:
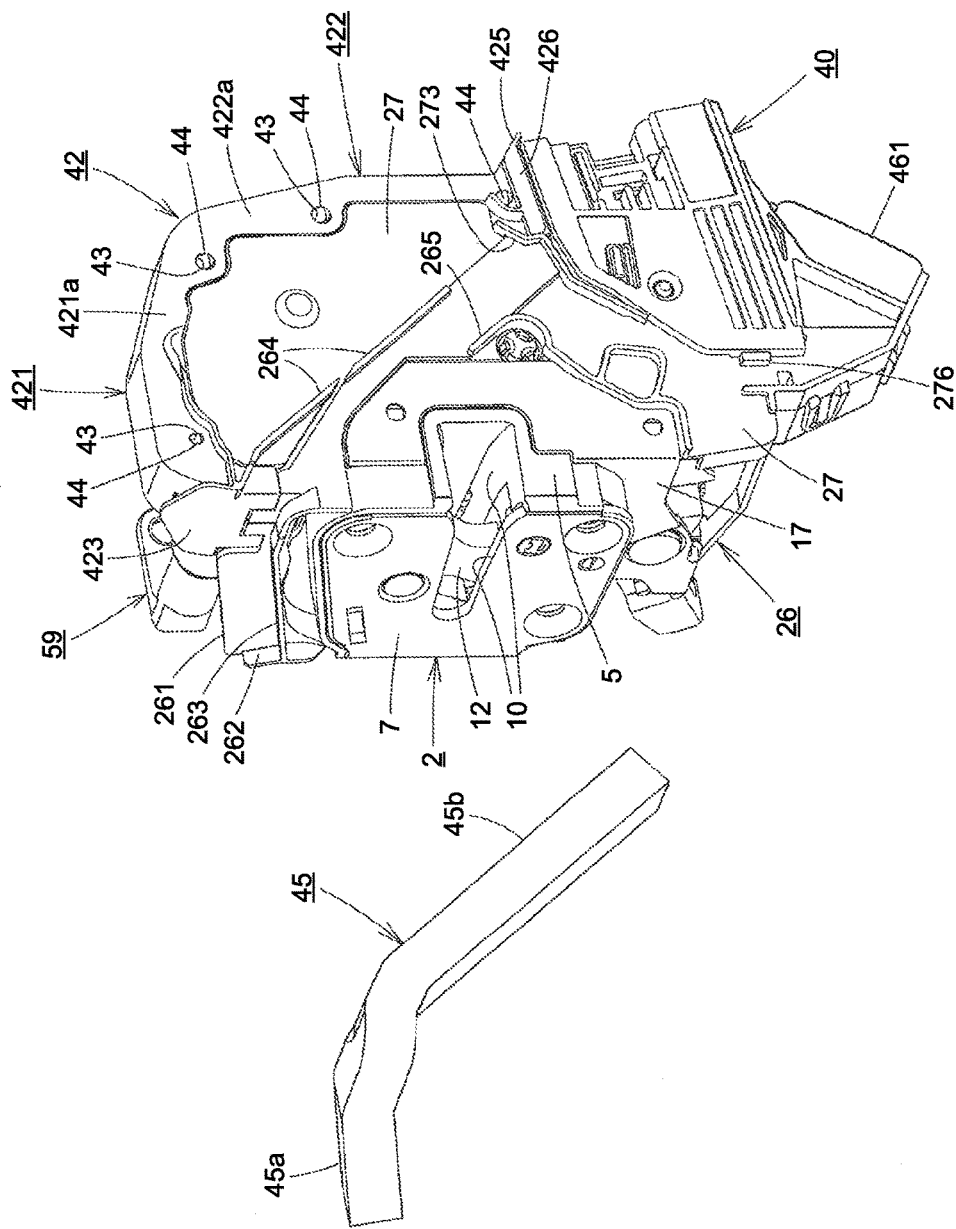
FIG. 16 is a perspective view illustrating the door latch device as viewed from an intra-vehicle side and a waterproof seal before attachment.

As illustrated mainly in FIG. 5, FIG. 6, and FIG. 16, at a rear end of the top waterproof cover 42, a water shielding wall portion 423, which is sloped slightly to the upper front, is mountain-shaped in its rear view, and is directed in the up-down direction, is integrally formed therewith. The water shielding wall portion 423 is provided to be continuous with a lower rear end of the upper side covering portion 421 and to be slightly separated from the rear surface of the upper side covering portion 421. An intra-extra vehicle direction dimension of this water shielding wall portion 423 is slightly larger than a width dimension of the upper side covering portion 421, and a height of its apex is substantially equal to that of an upper surface of the upper side covering portion 421. Further, on an opposing surface of a central portion between the water shielding wall portion 423 and the upper side covering portion 421, a partition piece 424, directed in the up-down direction, is provided. By the provision of the water shielding wall portion 423 and the partition piece 424, as illustrated with arrows in FIG. 6, rainwater flowing down from the upper surface to a rear surface side of the upper side covering portion 421 is guided to flow in the outward direction and inward direction of the vehicle, and thus the rainwater is prevented from flowing down to an upper portion side of the second case 26, which is installed with the engagement unit 2. As a result, even if a waterproof seal 45, described later, is deteriorated by temporal change and its waterproofness is ruined, there will be no risk that rainwater will enter the engagement unit 2 and the housing 23.

As illustrated in FIG. 4, FIG. 5, FIG. 8, FIG. 9, and FIG. 11, at a lower end on a front side of the top waterproof cover 42, the front side water shielding wall portion 425, which is visor-like, and the intra-vehicle side water shielding wall portion 426 and an extra-vehicle side water shielding wall portion 427, which have inverted L-shaped cross sections, are formed to be continuous respectively with a lower end of the front side covering portion 422 and lower ends of the extra-vehicle side and intra-vehicle side rearward pieces 422a. An intra-extra vehicle direction width dimension of the front side water shielding wall portion 425 is slightly greater than an intra-extra vehicle direction dimension of the housing 23, and the front side water shielding wall portion 425 is sloped to the lower front so as to be able to cover directly above the conduit fixing portion 29 in the first case 25 and an upper end portion on a front side of the auxiliary cover 40. Thereby, rainwater flowing down along the front side covering portion 422 of the top waterproof cover 42 is prevented from entering the housing 23 from the insertion portions of the conduits 32 and 34 in the conduit fixing portions 29 and 30.

A front-rear direction length of the intra-vehicle side water shielding wall portion 426 is substantially equal to a front-rear direction length of the upward protruding piece 404 at the upper end of the auxiliary cover 40, and the upward protruding piece 404 is covered by the intra-vehicle side water shielding wall portion 426 when the top waterproof cover 42 is attached to the housing 23. Thereby, rainwater flowing down along a side surface on the intra-vehicle side of the cover 27 and top waterproof cover 42 is guided towards a surface of the auxiliary cover 40, and rainwater that has entered into the gap between the cover 27 and auxiliary cover 40 is prevented from entering the housing 23 from the opening 35 formed in the cover 27.

As illustrated in FIG. 1 to FIG. 6, FIG. 16, and FIG. 17, above a rear surface side of the engagement unit 2, the waterproof seal 45 is attached to an upper end portion on a rear surface side of the second case 26 and to the side surface on the intra-vehicle side of the cover 27. This waterproof seal 45 is, for example, a compressible, sponge-like, and band-shaped with sufficient thickness. By the waterproof seal 45, which is bent towards the second case 26 and the cover 27, an upper seal portion 45a, which covers an upper portion on the rear surface side of the engagement unit 2 and a side seal portion 45b, which covers an upper front portion on the intra-vehicle side of the engagement unit 2, are formed. As illustrated in FIG. 6, the upper seal portion 45a is opposite to a rear surface of the inner panel D1 in the door D, and the side seal portion 45b is opposite to an inner surface of the inner panel D1. The waterproof seal 45 is stuck with a double sided adhesive tape stuck on a reverse surface of the waterproof seal 45, or with an adhesive applied onto the reverse surface.

Above the rear surface of the engagement unit 2 in the second case 26, a seal sticking portion 261, to which a reverse surface (front surface) of the upper seal portion 45a of the waterproof seal 45 is stuck, is provided. The seal sticking portion 261 is provided upward in a protruding manner so as to be sloped slightly downward in the outward direction of the vehicle. At a side end and a lower end on the extra-vehicle side of this seal sticking portion 261, a first positioning portion 262, which receives and positions a side end on the extra-vehicle side of the waterproof seal 45 and is in the up-down direction, and a second positioning portion 263, which receives and positions a lower surface of the waterproof seal 45 and is in the intra-extra vehicle direction, are respectively provided rearward and integrally therewith in a protruding manner. The first positioning portion 262 and the second positioning portion 263 form an upper positioning unit. Further, the seal sticking portion 261 also serves as a water shielding wall that prevents rainwater flowing down from a rear surface of the top waterproof cover 42 from flowing down towards an upper portion on the engagement unit 2 side. That is, as illustrated with the arrows in FIG. 6, the seal sticking portion 261 is provided so as to abut against or be adjacent to a side end on the extra-vehicle side of the water shielding wall portion 423 at the rear end of the top waterproof cover 42. Thereby, rainwater flowing down from the rear surface of the top waterproof cover 42 is guided in the outward direction of the vehicle along the seal sticking portion 261 and is prevented from flowing down to above the engagement unit 2.

At a central portion on the side surface on the intra-vehicle side of the cover 27, that is, at an upper portion separated from an opening on the intra-vehicle side of the striker advancing groove 10 formed in the body 5 of the engagement unit 2, a third positioning portion 264, which is for positioning the side seal portion 45b of the waterproof seal 45 and is rib-shaped, is provided. The third positioning portion 264 is provided in a protruding manner, so as to be sloped diagonally to the lower front from around a rear end portion of the top waterproof cover 42. Although the third positioning portion 264 is not continuously formed, the third positioning portion 264 may, of course, be continuously formed. An upper end of the third positioning portion 264 is continuous with a side end on the intra-vehicle side of the water shielding wall portion 423 of the top waterproof cover 42. Further, at a central portion on the side surface on the intra-vehicle side of the cover 27, the central portion being separated from a lower portion of the third positioning portion 264, a fourth positioning protruding portion 265, which is for positioning a lower end portion of the side seal portion 45b of the waterproof seal 45 and has a short dimension, is provided. The fourth positioning portion 265 is provided in a protruding manner parallel to the third positioning portion 264. The third positioning portion 264 and the fourth positioning portion 265 form a side positioning unit.

To attach the waterproof seal 45, first, the side end and the lower surface on the extra-vehicle side of the upper seal portion 45a are respectively abutted against the first positioning portion 262 and the second positioning portion 263 of the second case, to position the upper seal portion 45a in the intra-extra vehicle direction and up-down direction. In this state, the reverse surface of the upper seal portion 45a is stuck onto the rear surface of the seal sticking portion 261 and the lower portion on the rear surface of the top waterproof cover 42.

Subsequently, while positioning the side seal portion 45b bent towards the cover 27 in the up-down direction and front-rear direction by extending the side seal portion 45b diagonally to the lower front along the third positioning portion 264 of the cover 27 and positioning the lower end portion of the side seal portion 45b between the third positioning portion 264 and the fourth positioning portion 265, the reverse surface of the side seal portion 45b is stuck onto the side surface on the intra-vehicle side of the cover 27. When this is done, an upper end portion of the first rainwater guide protruding portion 273 provided in the cover 27 is able to serve as a guide for an end point of a sticking position of the side seal portion 45b, by the upper end portion being regarded as serving as a fifth positioning portion that positions the lower end of the side seal portion 45b. The lower end of the side seal portion 45b may be stuck so as to abut against or be adjacent to the upper end portion of the first rainwater guide protruding portion 273.

Figure 17:
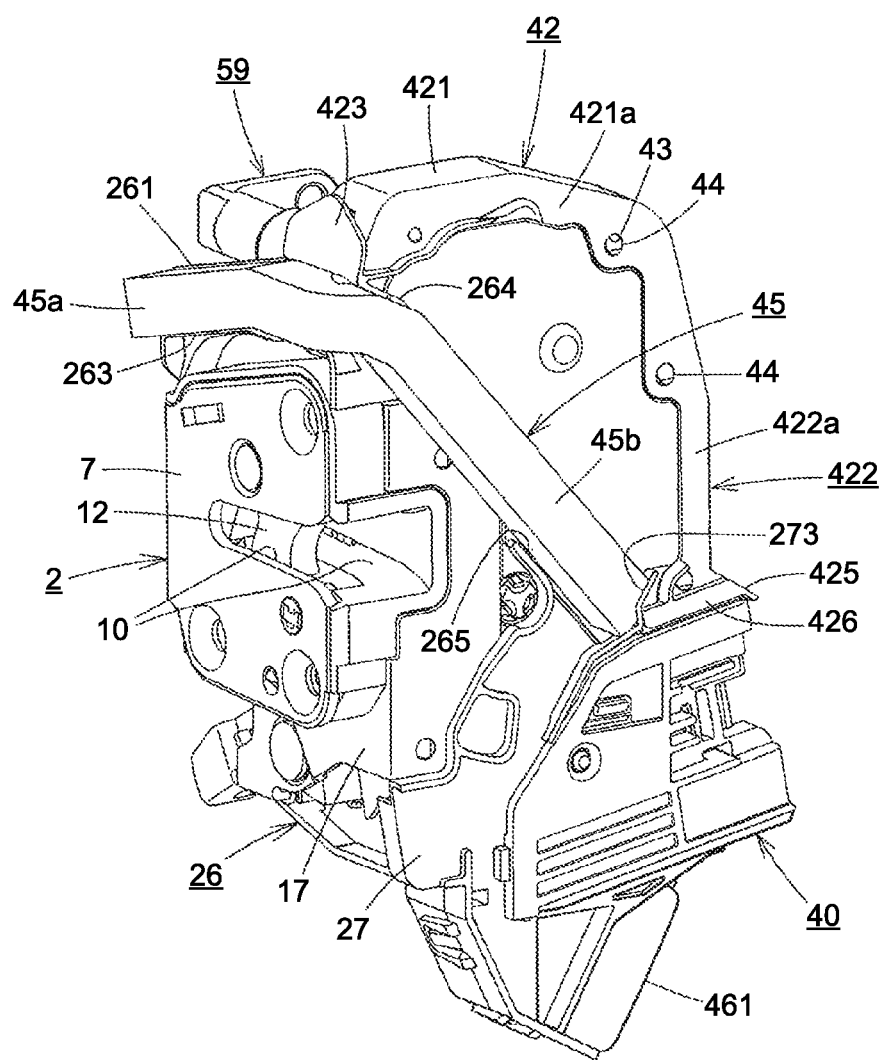
FIG. 17 is a perspective view after the attachment of the same waterproof seal.
Figure 18:
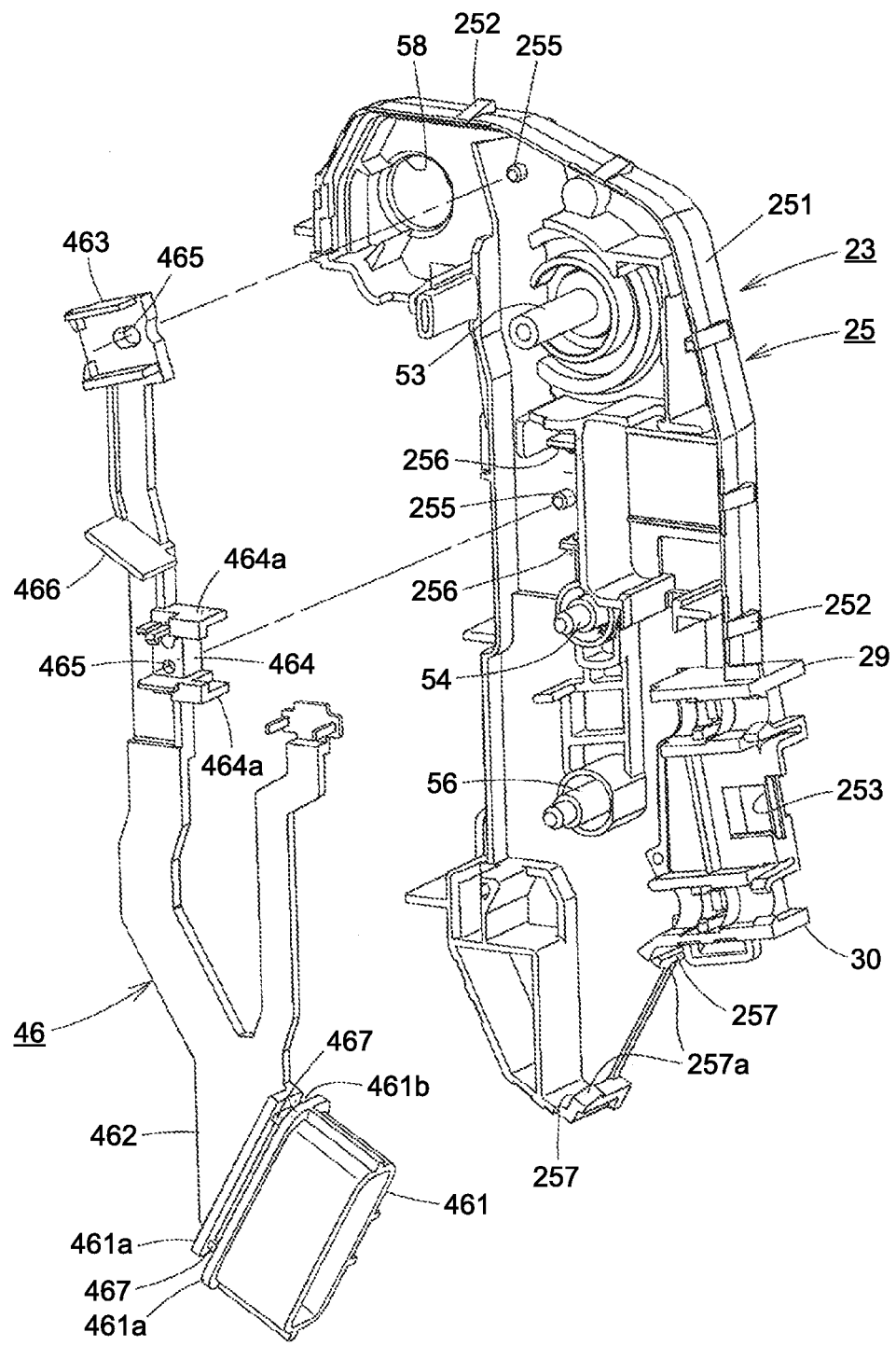
FIG. 18 is an enlarged perspective view of a switch plate and a housing before attachment of the switch plate, as viewed from the intra-vehicle side.

Thereby, as mainly illustrated in FIG. 17, the upper portion on the rear surface side and the upper front on the intra-vehicle side of the striker advancing groove 10, which is formed in the cover plate 7 of the engagement unit 2 and the body 5, are covered by the waterproof seal 45. When the door latch device 1 is installed in the door D, as illustrated in FIG. 6, the upper seal portion 45a and the side seal portion 45b are compressed by abutting against the rear surface of the inner panel D1 of the door D and the inner surface of the inner panel D1, respectively. Therefore, a gap formed between the engagement unit 2 and the inner panel D1 is closed by the waterproof seal 45, and rainwater that has entered inside the door D is prevented from entering into the striker advancing groove 10 from above.

Further, as described above, in the rear surface top portion of the top waterproof cover 42, the water shielding wall portion 423, which guides rainwater flowing down from the rear surface of the top waterproof cover 42 in the intra-extra vehicle direction, is provided, and the seal sticking portion 261 in the upper portion of the second case 26 has a function as a water shielding wall that guides rainwater flowing down from the rear surface of the top waterproof cover 42 to the extra-vehicle side, and thus an amount of rainwater flowing towards the rear surface side of the engagement unit 2 becomes extremely small. Therefore, only the upper seal portion 45a of the waterproof seal 45 stuck on the rear surface side of the engagement unit 2, the upper seal portion 45a, which covers the top portion on the rear surface side of the engagement unit 2, will be sufficient, and as compared to waterproof seals stuck onto conventional door latch devices, a length of the waterproof seal 45 is able to be made shorter and its sticking ability is able to be improved. Rainwater guided towards the intra-vehicle side of the cover 27 by the water shielding wall portion 423 of the top waterproof cover 42 flows down to the lower front along the upper surface of the third positioning portion 264, and thus an amount of rainwater flowing towards the side seal portion 45b of the waterproof seal 45 becomes extremely small.

Further, the first to fourth positioning portions 262, 263, 264, and 265 are provided on the rear surface of the second case 26 and the side surface on the intra-vehicle side of the cover 27, so that positioning upon sticking of the waterproof seal 45 is enabled. Thereby, a sticking start position and a sticking position for the waterproof seal 45 are clarified, and the waterproof seal 45 is able to be easily stuck to a fixed position on the engagement unit 2 and the cover 27, and thus workability upon the sticking is improved.

As illustrated in FIG. 7 and FIG. 18 to FIG. 20, inside the operation mechanism accommodating portion 24 of the first case 25 in the housing 23, the switch plate 46, which is directed in the up-down direction, is installed. This switch plate 46 is integrally molded together with a female connector portion 461; with plural electrically conductive plates 47 being embedded in a synthetic resin 462 by insert molding, the plural electrically conductive plates 47 being able to conduct electricity to electrical components, such as a motor 48, the rotary switch 60, and the limit switch 61, which will be described later and are incorporated in the operation mechanism accommodating portion 24; and with plural terminal portions 471 of the female connector portion 461 and a portion electrically conductive to the motor 48, the rotary switch 60, and the limit switch 61, being exposed. The synthetic resin 462 used in the insert molding is preferably formed of, for example, a resin mixture of a polybutyrene terephthalate resin (PBT resin) and an ABS resin, the resin mixture added with glass fiber.

At an upper end portion and an up-down direction intermediate portion of the switch plate 46, a rotary switch attachment portion 463 and a limit switch attachment portion 464, which has a pair of upper and lower switch holding pieces 464a and 464a directed forward, are respectively molded integrally with the synthetic resin 462. In each of the attachment portions 463 and 464, an engagement hole 465 in the intra-extra vehicle direction is formed. Further, slightly above the limit switch attachment portion 464, an abutment piece 466, which is abuttable against the reverse surface of the cover 27 when the above described cover 27 is attached to the first case 25, is provided in a protruding manner in the inward direction of the vehicle. The upper and lower switch holding pieces 464a of the limit switch attachment portion 464 also serve as an engaged unit engageable with a later described first engagement portion 256, which is provided in the first case 25. A terminal of the rotary switch 60, which is attached to the rotary switch attachment portion 463, and a terminal of the limit switch 61, which is attached to the limit switch attachment portion 464, are fixed by resistance welding to the electrically conductive portion of the electrically conductive plates 47, which is exposed from the synthetic resin 462 in the switch plate 46.

The female connector portion 461 is formed to be directed diagonally to the lower front, and flange portions 461a and 461a, which are slightly separated from each other, are formed at a proximal end portion (root portion) of the female connector portion 461. At upper and lower portions in an engagement groove portion 461b, which is between opposite surfaces of the flange portions 461a and 461a, engaged portions 467 and 467, which are engageable with engagement claws 257a of a pair of second engagement portions 257 provided at a lower end portion of the first case 25 and described later, are provided.

At an upper portion and an intermediate portion on a side surface on the intra-vehicle side of the first case 25, to which the switch plate 46 is attached, shaft-like protruding portions 255 and 255, with which the upper and lower engagement holes 465 of the switch plate 46 are engaged by fitting, are provided in a protruding manner. Further, at the intermediate portion on the side surface on the intra-vehicle side of the first case 25, a pair of upper and lower first engagement portions 256 and 256, with and by which the limit switch attachment portion 464 of the switch plate 46 is elastically engaged and held, are formed oppositely to each other with the lower protruding portion 255 disposed therebetween.

Furthermore, at a portion in the first case 25, which is opposite to a proximal end portion of the female connector portion 461, the pair of second engagement portions 257 and 257 and the engagement claws 257a and 257a are provided, the engagement claws 257a provided downward in a protruding manner on opposite surfaces of these second engagement portions 257. The pair of second engagement portions 257 are fitted to the upper and lower portions of the engagement groove portion 461b of the female connector portion 461. These engagement claws 257a and 257a are provided inward in a protruding manner on the opposite surfaces of both of the second engagement portions 257, and are engageable with end surfaces on the intra-vehicle side of the pair of engaged portions 467 and 467 in the engagement groove portion 461b. The upper and lower protruding portions 255, the pairs of upper and lower first engagement portions 256, and second engagement portions 257, which are provided in the first case 25; and the upper and lower engagement holes 465, the switch holding pieces 464a, and the engaged portions 467, which are provided in the switch plate 46 and the female connector portion 461, form an engagement means.

Figure 19:
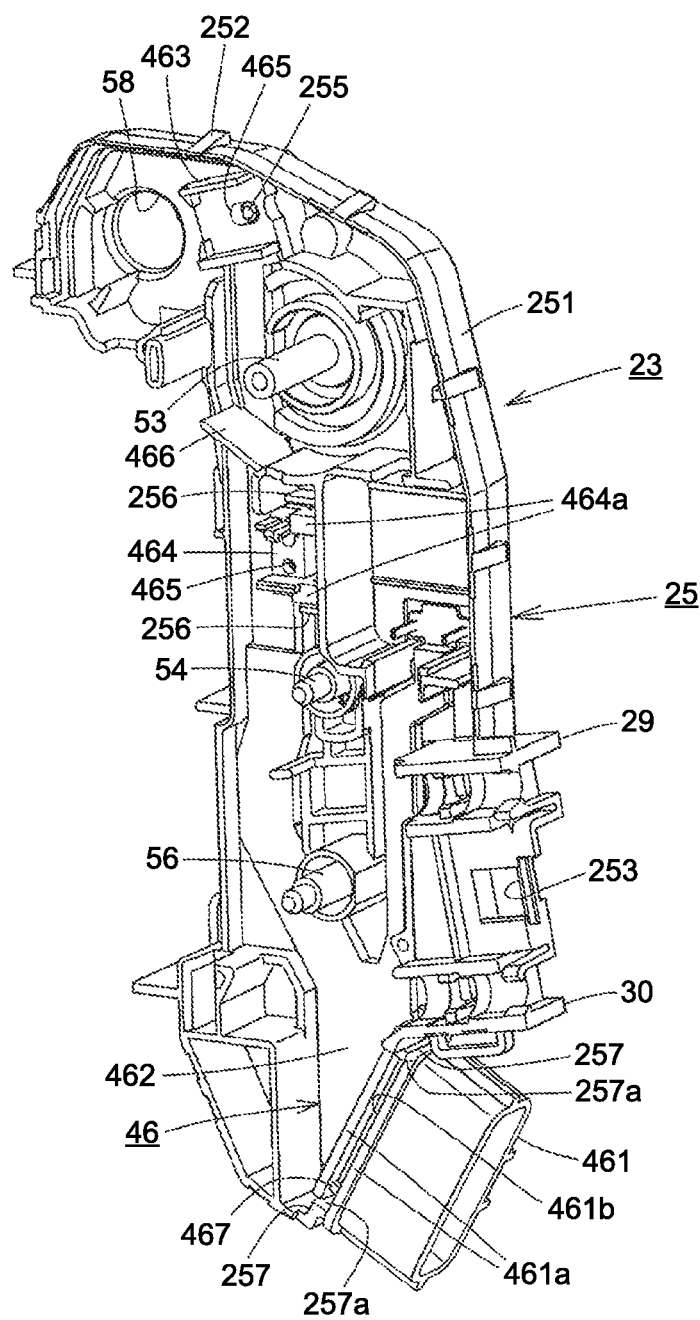
FIG. 19 is an enlarged perspective view of the same switch plate having been attached to the same housing.
Figure 20:
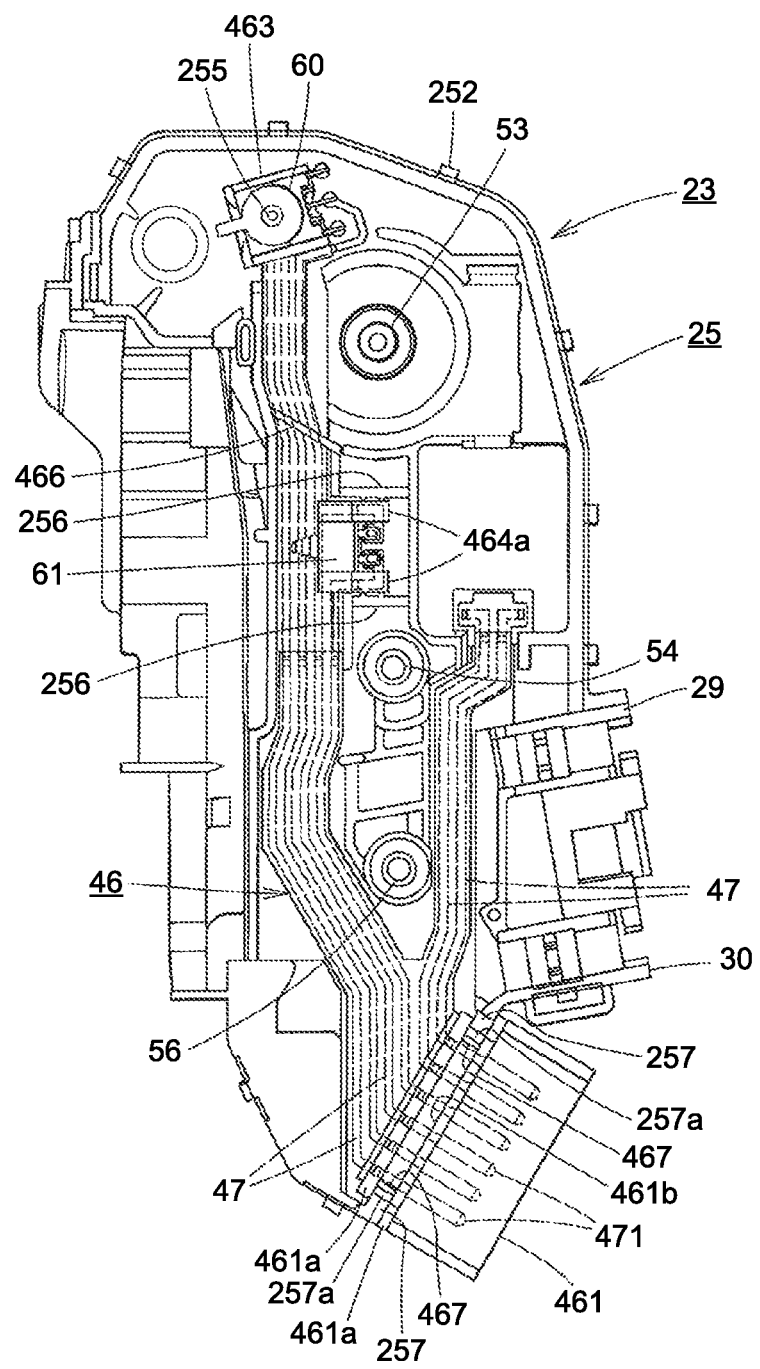
FIG. 20 is a left side view of the same switch plate having been attached to the same housing.

When the switch plate 46 is installed in the first case 25, the upper and lower engagement holes 465 are pushed and fitted to the upper and lower protruding portions 255 of the first case 25, and the upper and lower switch holding pieces 464a, which serve as the engaged unit in the limit switch attachment portion 464, are fitted and elastically held between the upper and lower first engagement portions 256. Further, the engagement groove portion 461b of the female connector portion 461 is pushed to the pair of second engagement portions 257 in the lower end portion of the first case 25, and the engagement claws 257a on the opposite surfaces of the second engagement portions 257 are engaged with the end faces on the intra-vehicle side of the pair of engaged portions 467 in the engagement groove portion 461b. Thereby, as illustrated in FIG. 19 and FIG. 20, the switch plate 46 is stably attached to the side surface on the intra-vehicle side of the first case 25 without floating or loosening thereof being caused. Furthermore, just by pushing the switch plate 46 towards the first case 25, the plural upper and lower engagement means are able to be engaged with each other, and thus installation work of the switch plate 46 in the first case 25 becomes efficient.

As described above, when the switch plate 46, which is separately formed from the housing 23 by insert molding, is installed in the first case 25, the insert molding step needs to be performed only once. That is, conventionally, two insert molding steps, which are a first step of forming the switch plate 46 itself by insert molding and a second step of fixing this switch plate 46 to the housing 23 by insert molding, have been required. In contrast, if only a single insert molding step is needed, since the manufacturing cost for molds and the man-hours are reduced, the cost of the door latch device is reduced.

Further, since different synthetic resin materials are able to be used in molding the housing 23 and the switch plate 46, options for the materials are increased. Accordingly, the material cost is able to be saved by, for example, molding the housing 23, which is large, with an inexpensive synthetic resin material. Further, by molding the female connector portion 461 integrally with the switch plate 46, excellent waterproofness is able to be achieved.

Next, a configuration of the above described operation mechanism 28 including the actuator 4 for locking/unlocking operation, the operation mechanism 28 incorporated in the operation mechanism accommodating portion 24 of the first case 25 in the housing 23, will be described. As illustrated in FIG. 1 and FIG. 7, the actuator 4 includes: the motor 48, which is actuated based on operation of a remote control switch or the like (illustration thereof omitted) by being connected to the above described switch plate 46 and is normally and reversely rotatable; a worm 49, which is fixed to a rotary shaft 48a of this motor 48, the rotary shaft 48a directed upwards; a worm wheel 51, which is driven by the worm 49, and has a cross-shaped driving portion 50, that is integrally fixed to one of rotary surfaces on the intra-vehicle side thereof; and the actuation member 52, which is moved to an upper locked position and a lower unlocked position by the driving portion 50 and is in the up-down direction. The motor 48 is accommodated without play, on a front portion side in the operation mechanism accommodating portion 24, to be directed in the up-down direction. The worm wheel 51 is freely rotatably supported by a support shaft 53 provided in a protruding manner on a side surface on the intra-vehicle side of the operation mechanism accommodating portion 24.

The knob lever 55, which forms a part of the operation mechanism 28, is pivotally supported by a support shaft 54, which is provided in a protruding manner from a central portion of the operation mechanism accommodating portion 24. This knob lever 55 is linked with the actuation member 52, and is coupled, via the cable 31 of the conduit 32, to the locking knob (illustration thereof omitted), which is provided for locking/unlocking operation and on the intra-vehicle side of the door. When the locking knob is operated, the actuation member 52 moves upward or downward, and the above described locking/unlocking lever 19, which is linked with this actuation member 52, is switched over between the locked state and unlocked state.

The inside lever 57 is freely rotatably supported pivotally by the support shaft 56, which is provided in a protruding manner at the central portion at the lower portion of the operation mechanism accommodating portion 24. This inside lever 57 is coupled, via the cable 33 of the conduit 34, to an operation handle (illustration thereof omitted) on the intra-vehicle side. The inside lever 57 pivots in a lock releasing direction (counterclockwise in FIG. 7), when the operation handle on the intra-vehicle side is operated for opening of the door.

A key lever 59 is installed in an installation hole 58, which is provided in an upper end portion on a rear portion side of the operation mechanism accommodating portion 24. A coupling arm portion 59*a* of this key lever 59, which protrudes to the extra-vehicle side of the first case 25, is linked with a key cylinder (illustration thereof omitted) of the door. A linking plate 59*b*, which is linkable with the actuation member 52 and is roughly fan-shaped, is formed forward at an end portion on the intra-vehicle side of the key lever 59. In a front end portion of a surface on the intra-vehicle side of the linking plate 59*b*, a concave portion 59*c*, which is in a circumferential direction and is arc-shaped, is formed. A protruding portion 521, which is provided in a protruding manner at an upper end portion of the actuation member 52 and is in the outward direction of the vehicle, is fitted into this concave portion 59*c*, from the intra-vehicle side thereof.

When the locking/unlocking lever 19 is in the locked state, if the key cylinder is operated for unlocking, the key lever 59 pivots clockwise by a predetermined amount from a neutral position (position illustrated in FIG. 7), and an upper stepped portion 59*d* in the concave portion 59*c* of the key lever 59 abuts against the protruding portion 521 of the actuation member 52 from above. Thereby, the actuation member 52 is moved to the lower unlocked position (position illustrated in FIG. 7) from the upper locked position, and the locking/unlocking lever 19 is switched over to the unlocked state via the actuation member 52.

Further, when the locking/unlocking lever 19 is in the unlocked state, if the key cylinder is operated for locking, the key lever 59 pivots counterclockwise by a predetermined amount from the neutral position and a lower stepped portion 59*d* in the concave portion 59*c* abuts against the protruding portion 521 from below. Thereby, the actuation member 52 is moved to the upper locked position from the lower unlocked position, and the locking/unlocking lever 19 is switched over to the locked state via the actuation member 52. This switch over operation between the locked and unlocked positions is detected by the rotary switch 60, which is attached to the rotary switch attachment portion 463 of the above described switch plate 46.

When the actuation member 52 moves to the locked position and the unlocked position, the limit switch 61, which is attached to the limit switch attachment portion 464 at the intermediate portion of the switch plate 46, is actuated and the motor 48 of the actuator 4 is stopped. That is, as illustrated in FIG. 7, when the actuation member 52 moves to the locked position and the unlocked position, an expandable and contractible protruding portion 61*a* at a distal end of the limit switch 61 comes in contact with an actuation protruding portion 522, which is provided in a protruding manner on a side surface on the extra-vehicle side of the actuation member 52. Thereby, an ON or OFF stop signal that stops the motor 48 is generated.

As illustrated in FIG. 1, at a central portion of the cover 27, a shaft hole 62 is provided, and an override lever 63, which is linked with the inside lever 57, is pivotally supported by this shaft hole 62. Regardless of a state of the locking/unlocking mechanism, the override lever 63 allows the door to be open by releasing the engaged state of the engagement mechanism 9.

The driving portion 50 of the worm wheel 51 is formed of: a lock drive protruding portion 501*a*, that is able to move the actuation member 52 to the locked position; an unlock drive protruding portion 501*b*, that is adjacent to the lock drive protruding portion 501*a* and is able to move the actuation member 52 to the unlocked position; and two stoppage protruding portions 501*c* and 501*d*, that are adjacent to each other on an opposite side of the lock drive protruding portion 501*a* and the unlock drive protruding portion 501*b* and are able to stop rotation of the worm wheel 51 and the driving portion 50.

The lock drive protruding portion 501*a*, the unlock drive protruding portion 501*b*, and the two stoppage protruding portions 501*c* and 501*d* are formed so as to center around the support shaft 53, extend toward a circumference of the worm wheel 51, and be separated from one another by 90 degrees in the circumferential direction to form a cross-shape in their side view. Lengths of the respective protruding portions 501*a* to 501*d* in the radial direction are less than a radius of the worm wheel 51. Further, the lock drive protruding portion 501*a* and the unlock drive protruding portion 501*b* have lengths to be able to move the actuation member 52 to the upper locked position and the lower unlocked position.

At an upper end portion of the actuation member 52, the upper end portion opposite to the driving portion 50, a concave portion 64, which is open on the driving portion 50 side, is formed, and a buffer member 65 with a silencing function is fixed in the concave portion 64. In the buffer member 65, a concave portion 65*a* is formed, which is open on the driving portion 50 side, from and into which the lock drive protruding portion 501*a* and the unlock drive protruding portion 501*b* are able to exit and enter, and which is C-shaped in its side view. Upper and lower opposite surfaces of this concave portion 65*a* are driven surfaces 65*b* and 65*b*, against which the lock drive protruding portion 501*a* and the unlock drive protruding portion 501*b* are respectively able to abut.

Figure 21:
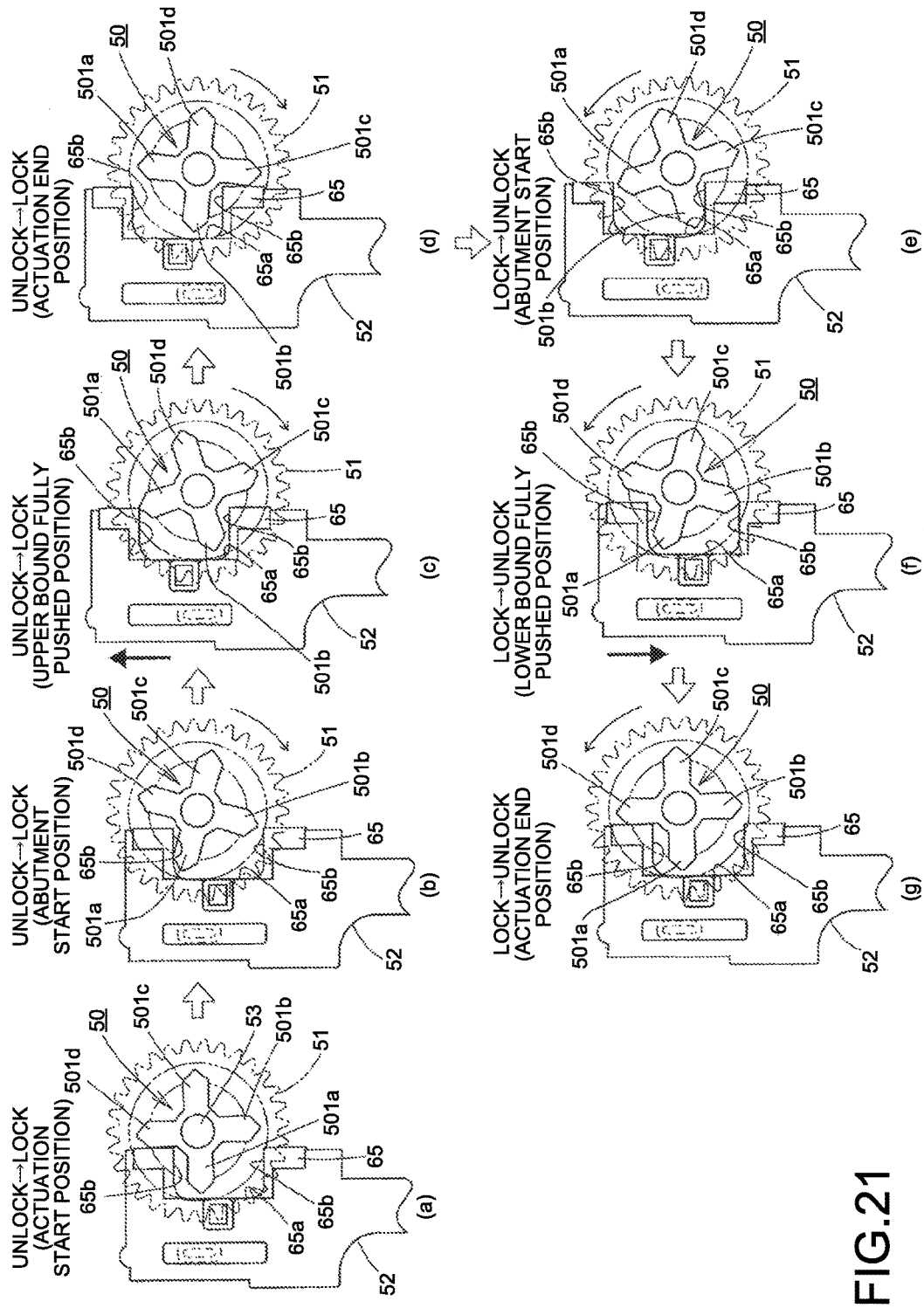
FIG. 21 is a side view of main parts illustrating action of an actuator when an actuation member is moved to a locked position and an unlocked position.

As illustrated in detail in FIG. 21, a depth dimension of the concave portion 65*a* has a size such that distal ends of the lock drive protruding portion 501a and the unlock drive protruding portion 501b are able to rotate without contacting a deep surface of the concave portion 65a when the driving portion 50 rotates. Further, a vertical width dimension of the concave portion 65a has a size, such that the lock drive protruding portion 501a and the unlock drive protruding portion 501b go thereinto simultaneously when the actuation member 52 is moved upwards or downwards in association with rotation of the driving portion 50. The buffer member 65 is formed of, for example, a polyester elastomer (trade name: Hytrel) having appropriate hardness and elasticity.

Next, actions of the actuator 4 will be described with reference to FIG. 21. In FIG. 21, (a) to (d) illustrate a case where the actuation member 52 in the unlocked position is moved to the locked position. FIG. 21(a) is an actuation start position in this case, that is, a state where the actuation member 52 is in the lower unlocked position, and the motor 48 of the actuator 4 is being stopped by a stop signal of the above described limit switch 61. In the state of FIG. 21(a), the lock drive protruding portion 501a in the driving portion 50 has gone inside the concave portion 65a, and the upper stoppage protruding portion 501d, adjacent to this lock drive protruding portion 501a, has abutted against a front surface of an upper portion of the buffer member 65 opposite thereto.

In the state of FIG. 21(a), for example, when the motor 48 of the actuator 4 is normally rotated by operation of the remote control switch or the like, as illustrated in FIG. 21(b), the worm wheel 51 and the driving portion 50 start to rotate clockwise. Thereby, the lock drive protruding portion 501a, that has gone into the concave portion 65a, abuts against a lower surface of the upper driven surface 65b of the concave portion 65a from below. Simultaneously therewith, the unlock drive protruding portion 501b, adjacent to the lock drive protruding portion 501a, also starts to advance into the concave portion 65a.

When the worm wheel 51 and the driving portion 50 are further rotated clockwise from this state, as illustrated in FIG. 21(c), by rotational drive force of the lock drive protruding portion 501a, the actuation member 52 is pushed up. The upward movement of the actuation member 52 continues until immediately before the distal end of the lock drive protruding portion 501a comes off from the upper driven surface 65b, and this state being an upper bound fully pushed position of the actuation member 52, the actuation member 52 is moved upward to the unlocked position. The unlock drive protruding portion 501b deeply advances into the concave portion 65a.

When the worm wheel 51 and driving portion 50 are slightly rotated clockwise from the state illustrated in FIG. 21(c), as illustrated in FIG. 21(d), the distal end of the lock drive protruding portion 501a comes off from the upper driven surface 65b, the stoppage protruding portion 501c, which is on the opposite side of the lock drive protruding portion 501a, abuts against a front surface of a lower portion of the buffer member 65 opposite thereto, and the driving portion 50 stops at the locked position. Simultaneously with this abutment, the above described limit switch 61 is actuated, and by a stop signal generated thereby, the motor 48 is stopped, and actuation of the actuator 4 is ended. When the actuation member 52 is moved to the upper locked position by the actuator 4, the locking/unlocking lever 19 linked with the actuation member 52 is switched over to the locked state, and thereby opening operation of the door is disabled.

In FIG. 21, (e) to (g) illustrate a case where the actuation member 52 is moved from the locked position to the unlocked position. In a state of FIG. 21(d), for example, when the motor 48 is reversely rotated by operation of the remote control switch or the like, as illustrated in FIG. 21(e), the worm wheel 51 and the driving portion 50 start to rotate counterclockwise. Thereby, the unlock drive protruding portion 501b, which has gone into the concave portion 65a and has been stopping, abuts against an upper surface of the driven surface 65b of a lower portion of the concave portion 65a from above. Simultaneously therewith, the lock drive protruding portion 501a also starts to advance into the concave portion 65a.

When the worm wheel 51 and the driving portion 50 are further rotated counterclockwise from this state, as illustrated in FIG. 21(f), by rotational drive force of the unlock drive protruding portion 501b, the actuation member 52 is pushed down. The downward movement of the actuation member 52 continues until immediately before the distal end of the unlock drive protruding portion 501b comes off from the lower driven surface 65b, and this state being a lower bound fully pushed position of the actuation member 52, the actuation member is moved down to the unlocked position. The lock drive protruding portion 501a deeply advances into the concave portion 65a.

When the worm wheel 51 and the driving portion 50 are further slightly rotated counterclockwise from the state illustrated in FIG. 21(f), as illustrated in FIG. 21(g), the distal end of the unlock drive protruding portion 501b comes off from the lower driven surface 65b, the stoppage protruding portion 501d on the opposite side of the unlock drive protruding portion 501b abuts against the front surface of the upper portion of the buffer member 65 opposite thereto, and the driving portion 50 stops at the unlocked position. Simultaneously with this abutment, the above described limit switch 61 is actuated, and by a stop signal generated thereby, the motor 48 is stopped, and actuation of the actuator 4 is ended. This actuation end position and the actuation start position in FIG. 21(a) are of the same state. Therefore, when the motor 48 of the actuator 4 is normally rotated, the actuation member 52 is able to be moved from the unlocked position to the locked position. When the actuation member 52 is moved to the lower unlocked position by the actuator 4, the locking/unlocking lever 19, which is linked with the actuation member 52, is also switched over to the unlocked state, and thereby opening operation of the door is enabled.

As described above, the driving portion 50, which is provided in the worm wheel 51 and moves the actuation member 52 to the locked position and the unlocked position, is formed of the lock drive protruding portion 501a, the unlock drive protruding portion 501b, and the two stoppage protruding portions 501c and 501d, which are separated from one another by 90 degrees in the circumferential direction. Further, when the actuation member 52 is stopping at the locked position and the unlocked position, the lock drive protruding portion 501a and the unlock drive protruding portion 501b are positioned in the concave portion 65a of the actuation member 52, and during the movement of the actuation member 52 to the locked position or the unlocked position, the unlock drive protruding portion 501b or the lock drive protruding portion 501a also advances into the concave portion 65a simultaneously therewith. Further, when the driving portion 50 normally and reversely rotates, the actuation member 52 is moved to the locked position and the unlocked position by the lock drive protruding portion 501a and the unlock drive protruding portion 501b, and when the actuation member 52 moves to the locked position and unlocked position, the stoppage protruding portions 501c and 501d abut against the actuation member 52 so that rotation of the driving portion 50 is stopped. Thereby, an operation time of the motor 48 and a rotational angle of the worm wheel 51 by the actuator 4 become small, the operation time and rotational angle in and by which the actuation member 52 and the locking/unlocking lever 19, which is linked to the actuation member 52, are moved from the unlocked position to the locked position or reversely thereto and are stopped. As a result, the operation time of the actuator 4, from the operation on an operation switch, such as the remote control switch, to the switch-over of the door latch device 1 to the locked state and the unlocked state, is shortened.

Further, since each of the protruding portions 501a to 501d abuts against the buffer member 65 provided in the actuation member 52 and having the silencing function, impact noise upon the abutment is small.

Furthermore, since the actuation start position (FIG. 21(a)) before the actuation member 52 is actuated from the unlocked position to the locked position and the actuation end position (FIG. 21(g)) after the actuation member 52 has been actuated from the locked position to the unlocked position are of the same state, the worm wheel 51 does not need to be returned to an initial position after being moved to the respective positions, and a spring or the like for the return is also not needed.

As described above, the switch plate 46, which is formed separately from the housing 23 by insert molding, is able to be stably fixed, without loosening, to the first case of the housing 23 by only plural engagement means, without use of a fixing means, such as screws. Therefore, the conventional second step of integrally molding the switch plate 46 with the housing 23 by further insert molding is not needed. Accordingly, a manufacturing cost for molds and man-hours are reduced, and a cost of the door latch device is reduced.

Further, different synthetic resin materials are able to be used in molding the housing 23 and the switch plate 46, and choices for the materials are increased, and thus material cost is able to be saved, as only the large housing 23 is able to be molded of an inexpensive synthetic resin material, for example. Furthermore, by integrally molding the female connector portion 461 with the switch plate 46, waterproofness is improved.

By integrally molding the rotary switch attachment portion 463 and the limit switch attachment portion 464 with the switch plate 46, by use of a synthetic resin for insert molding; the switch plate 46 is able to be fixed to the housing 23 in a state where the rotary switch 60 and the limit switch 61 have been attached to the switch plate 46 in advance.

Although an embodiment of the present invention has been described above, without departing from the gist of the present invention, various modifications and changes may be made to the embodiment. For example, the shape of the switch plate 46 of the above described embodiment may be changed, as appropriate, according to the arrangement of the motor 48, the rotary switch 60, and the limit switch 61, which are provided in the housing 23. Further, when application is made to a door latch device not including the rotary switch 60 and the limit switch 61, the dimension of the switch plate 46 is able to be shortened since only the motor 48 needs to be subjected to electric conduction.

REFERENCE SIGNS LIST

1 DOOR LATCH DEVICE
2 ENGAGEMENT UNIT
3 OPERATION UNIT
4 ACTUATOR
5 BODY
6 BOLT
7 COVER PLATE
8 STRIKER
9 ENGAGEMENT MECHANISM
10 STRIKER ADVANCING GROOVE
11 PIVOT SHAFT
12 LATCH
13 PIVOT SHAFT
14 LOCKING PLATE
15, 16 SPRING
17 BASE PLATE
18 OPENING LEVER
19 LOCKING/UNLOCKING LEVER
19a COUPLING PORTION
19b PROTRUDING PORTION
20 PIVOT SHAFT
21 OUTSIDE LEVER
22 SUB LEVER
22a FIRST LEVER
22b SECOND LEVER
22c ELONGATED HOLE
23 HOUSING
24 OPERATION MECHANISM ACCOMMODATING PORTION
25 FIRST CASE
26 SECOND CASE
27 COVER
28 OPERATION MECHANISM
29, 30 CONDUIT FIXING PORTION
29a, 30a ELASTIC CLAW PIECE
31, 33 CABLE
32, 34 CONDUIT
32a, 34a LARGE DIAMETER END PORTION
35 OPENING
36 HOLDING PIECE
37 ENGAGEMENT PROTRUDING PORTION
38 ELASTIC ENGAGEMENT PIECE
38a ENGAGEMENT HOLE
39 FITTING HOLE
40 AUXILIARY COVER
41 SHAFT HOLE
42 TOP WATERPROOF COVER
43 FITTING HOLE
44 PROTRUDING PORTION
45 WATERPROOF SEAL
45a UPPER SEAL PORTION
45a SIDE SEAL PORTION
46 SWITCH PLATE
47 ELECTRICALLY CONDUCTIVE PLATE
48 MOTOR
48a ROTARY SHAFT
49 WORM
50 DRIVING PORTION
51 WORM WHEEL
52 ACTUATION MEMBER
53, 54 SUPPORT SHAFT
55 KNOB LEVER
56 SUPPORT SHAFT
57 INSIDE LEVER
58 INSTALLATION HOLE
59 KEY LEVER
59a COUPLING ARM PORTION
59b LINKING PLATE
59c CONCAVE PORTION
59d STEPPED PORTION
60 ROTARY SWITCH
61 LIMIT SWITCH

61a PROTRUDING PORTION
62 SHAFT HOLE
63 OVERRIDE LEVER
64 CONCAVE PORTION
65 BUFFER MEMBER
65a CONCAVE PORTION
65b DRIVEN SURFACE
251 OUTER PERIPHERAL WALL
252 PROTRUDING PORTION
253 OPENING
254 ENGAGEMENT PIECE
255 PROTRUDING PORTION
256 FIRST ENGAGEMENT PORTION
257 SECOND ENGAGEMENT PORTION
257a ENGAGEMENT CLAW
261 SEAL STICKING PORTION
262 FIRST POSITIONING PORTION
263 SECOND POSITIONING PORTION
264 THIRD POSITIONING PORTION
265 FOURTH POSITIONING PORTION
271 OUTER PERIPHERAL WALL
272 ENGAGEMENT PIECE
273 FIRST RAINWATER GUIDE PROTRUDING PORTION
274 SECOND RAINWATER GUIDE PROTRUDING PORTION
275 THIRD RAINWATER GUIDE PROTRUDING PORTION
276 ENGAGEMENT PROTRUDING PORTION
277 FITTING PROTRUDING PORTION
277a ENGAGEMENT HOLE
401 PRESSING PIECE
402, 403 OUTER PERIPHERAL WALL PORTION
403a ENGAGEMENT CLAW
404 UPWARD PROTRUDING PIECE
405 ELASTIC ENGAGEMENT PIECE
405a ENGAGEMENT CLAW PORTION
406 INSERTION PIECE
407 ENGAGEMENT HOLE
408 ENGAGEMENT PROTRUDING PORTION
421 UPPER SIDE COVERING PORTION
421a DOWNWARD PIECE
422 FRONT SIDE COVERING PORTION
422a REARWARD PIECE
423 WATER SHIELDING WALL PORTION
424 PARTITION PIECE
425 FRONT SIDE WATER SHIELDING WALL PORTION
426 INTRA-VEHICLE SIDE WATER SHIELDING WALL PORTION
427 EXTRA-VEHICLE SIDE WATER SHIELDING WALL PORTION
461 FEMALE CONNECTOR PORTION
461a FLANGE PORTION
461b ENGAGEMENT GROOVE PORTION
462 SYNTHETIC RESIN
463 ROTARY SWITCH ATTACHMENT PORTION
464 LIMIT SWITCH ATTACHMENT PORTION
464a SWITCH HOLDING PIECE (ENGAGED UNIT)
465 ENGAGEMENT HOLE
466 ABUTMENT PIECE
467 ENGAGED PORTION
471 TERMINAL PORTION
501a LOCK DRIVE PROTRUDING PORTION
501b UNLOCK DRIVE PROTRUDING PORTION
501c, 501d STOPPAGE PROTRUDING PORTION
521 PROTRUDING PORTION
522 ACTUATION PROTRUDING PORTION
D DOOR
D1 INNER PANEL
S OPERATING FORCE TRANSMISSION MEMBER

The invention claimed is:

1. A vehicle door latch device comprising:
a body accommodating therein an engagement mechanism, the engagement mechanism being configured to restrain a door in a closed position by engaging with a striker;
a housing attached to the body and accommodating therein an operation mechanism including a motor, the operation mechanism performing a switch-over operation between an unlocked state where an engaged state of the engagement mechanism with the striker is releasable and a locked state where the engaged state is unreleasable;
a switch plate, which is provided in the housing, configured to conduct electricity to electrical components including the motor in the housing, the switch plate, being separate from the housing, including a synthetic resin body and an electrically conductive plate, the electrically conductive plate including an electrically conductive portion to be connected to the electrical components including the motor and a connection terminal portion to be connected to outside of the vehicle door latch device, the electrically conductive plate being embedded into the synthetic resin body in a state where the electrically conductive portion and the connection terminal portion are exposed, wherein
the switch plate includes a plurality of engagement holes, and the housing includes a plurality of protruding portions which are engaged with the respective engagement holes of the switch plate.

2. The vehicle door latch device according to claim 1, wherein a female connector portion, to which an external connector is connected, is integrally molded with the switch plate by use of a synthetic resin for insert molding, with the connection terminal portion being exposed inside the female connector portion.

3. The vehicle door latch device according to claim 2, wherein an engaged portion and an engagement portion, which are engageable with each other, are further provided in the female connector portion and the housing.

4. The vehicle door latch device according to claim 1, wherein an attachment portion for a rotary switch, which is the electrical component, is integrally molded with the switch plate, by use of a synthetic resin for insert molding.

* * * * *